(12) United States Patent
Nakamura et al.

(10) Patent No.: US 10,780,948 B2
(45) Date of Patent: Sep. 22, 2020

(54) BICYCLE OPERATING DEVICE

(71) Applicant: Shimano Inc., Sakai, Osaka (JP)

(72) Inventors: Tsuyoshi Nakamura, Osaka (JP); Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 66 days.

(21) Appl. No.: 16/214,855

(22) Filed: Dec. 10, 2018

(65) Prior Publication Data

US 2020/0180730 A1  Jun. 11, 2020

(51) Int. Cl.
  *B62M 25/04* (2006.01)
  *B62K 23/06* (2006.01)

(52) U.S. Cl.
  CPC ............. *B62M 25/04* (2013.01); *B62K 23/06* (2013.01)

(58) Field of Classification Search
  CPC .... B62M 25/04; B62M 25/045; B62M 25/02; B62K 23/06; B62K 23/04; G05G 1/04; F16C 1/12; F16C 1/18; Y10T 74/20438; Y10T 74/20274; Y10T 74/2028
  See application file for complete search history.

(56) References Cited

U.S. PATENT DOCUMENTS

| | | | | |
|---|---|---|---|---|
| 5,044,213 A | * | 9/1991 | Nagano | B62M 25/04 74/142 |
| 5,203,213 A | * | 4/1993 | Nagano | B62L 3/02 192/217 |
| 5,676,022 A | * | 10/1997 | Ose | B62K 23/06 74/489 |
| 5,682,794 A | * | 11/1997 | Shibata | B62K 23/06 74/489 |
| 5,730,030 A | * | 3/1998 | Masui | B62K 23/06 74/473.13 |
| 5,829,313 A | * | 11/1998 | Shahana | B62K 23/06 74/502.2 |
| 6,691,591 B2 | * | 2/2004 | Tsumiyama | B62K 23/04 74/489 |
| 7,526,979 B2 | | 5/2009 | Tsumiyama | |
| 7,628,095 B2 | | 12/2009 | Funai | |
| 2003/0166427 A1 | * | 9/2003 | Dillon | B62M 25/04 474/80 |

(Continued)

*Primary Examiner* — Daniel D Yabut
(74) *Attorney, Agent, or Firm* — Global IP Counselors, LLP

(57) ABSTRACT

A bicycle operating device includes a base, a pulling pawl, a positioning ratchet and a positioning pawl. The pulling pawl includes first and second apart contact parts that are spaced apart. The positioning pawl is movable between holding and releasing positions. The positioning pawl engages the positioning ratchet to selectively establish predetermined positions of the positioning ratchet while in the holding position. The positioning pawl disengages from the positioning ratchet to permit the positioning ratchet to move in one direction while in the releasing position. The first contact part contacts the positioning ratchet to move the positioning ratchet during movement of the positioning ratchet in the other direction from a first predetermined position of the predetermined positions. The second contact part contacts the positioning ratchet to move the positioning ratchet during movement of the positioning ratchet in the first direction from a second predetermined position of the predetermined positions.

24 Claims, 24 Drawing Sheets

(56) References Cited

U.S. PATENT DOCUMENTS

| | | | |
|---|---|---|---|
| 2006/0207375 A1* | 9/2006 | Jordan | ............... B62M 25/04 |
| | | | 74/489 |
| 2012/0297918 A1 | 11/2012 | Miki et al. | |
| 2015/0210342 A1 | 7/2015 | Fukao et al. | |
| 2015/0259024 A1 | 9/2015 | Kawakami | |

* cited by examiner

BICYCLE OPERATING DEVICE

BACKGROUND

Technical Field

This disclosure generally relates to a bicycle operating device that is used to operate a bicycle component.

Background Information

Bicycles are typically provided with one or more bicycle operating devices for operating one or more bicycle components. The bicycle operating devices can be mechanically, electrically, hydraulically, pneumatically connected to the bicycle component(s). Often, these bicycle operating devices have a plurality of predetermined positions that correspond to different settings, adjustments or positions of a bicycle component that is being operated. A conventional bicycle operating device can include a base, a positioning structure for selectively establishing the predetermined positions and one or more user operated inputs (operating members) to select one of the predetermined positions.

SUMMARY

Generally, the present disclosure is directed to various features of a bicycle operating device. In one feature, a bicycle operating device is provided that can be more compact as compared to a similar conventional bicycle operating device.

In view of the state of the known technology and in accordance with a first aspect of the present disclosure, a bicycle operating device is provided that basically comprises a base, a pulling pawl, a positioning ratchet and a positioning pawl. The pulling pawl includes a first contact part and a second contact part that is spaced apart from the first contact part. The positioning ratchet is movably disposed with respect to the base in a first direction and a second direction that is opposite to the first direction. The positioning pawl is movably disposed with respect to the base between a holding position and a releasing position. The positioning pawl engages the positioning ratchet to selectively establish a plurality of predetermined positions of the positioning ratchet with respect to the base while the positioning pawl is in the holding position. The positioning pawl is disengaged from the positioning ratchet to permit the positioning ratchet to move with respect to the base in the second direction while the positioning pawl is in the releasing position. The first contact part of the pulling pawl is configured to contact the positioning ratchet to move the positioning ratchet during movement of the positioning ratchet in the first direction from a first predetermined position of the predetermined positions. The second contact part of the pulling pawl is configured to contact the positioning ratchet to move the positioning ratchet during movement of the positioning ratchet in the first direction from a second predetermined position of the predetermined positions. The first predetermined position is different from the second predetermined position.

With the bicycle operating device according to the first aspect, it is possible to have many ratchet positions while still maintaining a compact overall size of the bicycle operating device.

In accordance with a second aspect of the present disclosure, the bicycle operating device according to the first aspect is configured so that the second contact part is configured to not contact the positioning ratchet during movement of the positioning ratchet in the first direction from the first predetermined position.

With the bicycle operating device according to the second aspect, it is possible to have the pulling pawl and the positioning pawl.

In accordance with a third aspect of the present disclosure, the bicycle operating device according to the first or second aspect is configured so that the first contact part is configured to not contact the positioning ratchet during movement of the positioning ratchet in the first direction from the second predetermined position.

With the bicycle operating device according to the third aspect, it is possible to have the pulling pawl and the positioning pawl.

In accordance with a fourth aspect of the present disclosure, the bicycle operating device according to any one of the first to third aspects is configured so that the first contact part and the second contact part are configured to both contact the positioning ratchet during movement of the positioning ratchet in the first direction from a third predetermined position of the predetermined positions. The third predetermined position is different from the first predetermined position and the second predetermined position.

With the bicycle operating device according to the fourth aspect, it is possible to have the pulling pawl and the positioning pawl.

In accordance with a fifth aspect of the present disclosure, the bicycle operating device according to any one of the first to fourth aspects is configured so that the first contact part is configured to contact a first ratchet tooth of a plurality of ratchet teeth of the positioning ratchet during movement of the positioning ratchet in the first direction from the first predetermined position. The second contact part is configured to contact a second ratchet tooth of the ratchet teeth during movement of the positioning ratchet in the first direction from the second predetermined position. The first ratchet tooth is different from the second ratchet tooth. The first contact part and the second contact part are each configured to contact one of the ratchet teeth of the positioning ratchet during movement of the positioning ratchet in the first direction from a third predetermined position of the predetermined positions. The third predetermined position is different from the first predetermined position and the second predetermined position.

With the bicycle operating device according to the fifth aspect, it is possible to have the pulling pawl and the positioning pawl perform multiple functions.

In accordance with a sixth aspect of the present disclosure, the bicycle operating device according to the fifth aspect is configured so that the second ratchet tooth is next to the first ratchet tooth.

With the bicycle operating device according to the sixth aspect, it is possible to sequentially establish the ratchet positions of the positioning ratchet.

In accordance with a seventh aspect of the present disclosure, the bicycle operating device according to any one of the first to sixth aspects is configured so that the first contact part is configured to be positioned between two of a plurality of ratchet teeth of the positioning ratchet while the positioning pawl is in the holding position.

With the bicycle operating device according to the seventh aspect, it is possible to quickly perform a pulling operation of the positioning ratchet.

In accordance with an eighth aspect of the present disclosure, the bicycle operating device according to any one of the first to seventh aspects is configured so that the first contact part is configured to not contact the positioning ratchet while the positioning pawl is in the holding position.

With the bicycle operating device according to the eighth aspect, it is possible to easily move the pulling pawl out of the path of the ratchet teeth so as not to interfere with a releasing operation of the positioning ratchet.

In accordance with a ninth aspect of the present disclosure, the bicycle operating device according to any one of the first to eighth aspects is configured so that the second contact part is configured to be positioned between two of a plurality of ratchet teeth of the positioning ratchet while the positioning pawl is in the holding position.

With the bicycle operating device according to the ninth aspect, it is possible to quickly perform a pulling operation of the positioning ratchet.

In accordance with a tenth aspect of the present disclosure, the bicycle operating device according to any one of the first to ninth aspects is configured so that the second contact part is configured to not contact the positioning ratchet while the positioning pawl is in the holding position.

With the bicycle operating device according to the tenth aspect, it is possible to easily move the pulling pawl out of the path of the ratchet teeth so as not to interfere with a releasing operation of the positioning ratchet.

In accordance with an eleventh aspect of the present disclosure, the bicycle operating device according to any one of the first to tenth aspects is configured so that the second contact part is configured to contact the positioning ratchet while the positioning ratchet is in a fully released position in the second direction.

With the bicycle operating device according to the eleventh aspect, it is possible to quickly perform a pulling operation of the positioning ratchet while the positioning ratchet is in a fully released position.

In accordance with a twelfth aspect of the present disclosure, the bicycle operating device according to any one of the first to eleventh aspects is configured so that the positioning pawl is configured to not engage the ratchet teeth of the positioning ratchet while the positioning ratchet is in a fully released position in the second direction.

With the bicycle operating device according to the twelfth aspect, it is possible to have the pulling pawl and the positioning pawl perform multiple functions.

In accordance with a thirteenth aspect of the present disclosure, the bicycle operating device according to any one of the first to twelfth aspects is configured so that at least three of the ratchet teeth are equally spaced apart by a first predetermined pitch interval and at least one of the ratchet teeth that is different from the three of the ratchet teeth is spaced apart from an adjacent one of the ratchet teeth by a second predetermined pitch interval that is larger than the first predetermined pitch interval.

With the bicycle operating device according to the thirteenth aspect, it is possible to have the positioning ratchet move the same amount for each of the ratchet positions.

In accordance with a fourteenth aspect of the present disclosure, the bicycle operating device according to any one of the first to thirteenth aspects is configured so that the positioning ratchet has at least twelve of the predetermined positions that are established by the positioning pawl selectively engaging to the positioning ratchet.

With the bicycle operating device according to the fourteenth aspect, it is possible to establish at least twelve ratchet positions.

In accordance with a fifteenth aspect of the present disclosure, the bicycle operating device according to any one of the first to fourteenth aspects further comprises a stop pawl movably disposed with respect to the base between a non-stopping position and a stopping position. The stop pawl is disposed out of a movement path of the positioning ratchet in the non-stopping position. The stop pawl is disposed in the movement path of the positioning ratchet in the stopping position.

With the bicycle operating device according to the fifteenth aspect, it is possible to limit a cable releasing action of the positioning ratchet to release only one ratchet position during a releasing operation.

In accordance with a sixteenth aspect of the present disclosure, the bicycle operating device according to the fifteenth aspect is configured so that the stop pawl is biased towards the non-stopping position.

With the bicycle operating device according to the sixteenth aspect, it is possible to ensure that the stop pawl limits the movement of the ratchet position during a releasing operation.

In accordance with a seventeenth aspect of the present disclosure, the bicycle operating device according to the fifteenth aspect is configured so that the stop pawl and the positioning pawl are connected by a mounting portion that is pivotally mounted with respect to the base.

With the bicycle operating device according to the seventeenth aspect, it is possible to have the stop pawl and the positioning pawl move together as a unit.

In accordance with an eighteenth aspect of the present disclosure, the bicycle operating device according to any one of the first to seventeenth aspects further comprises a wire takeup arranged to move together with the positioning ratchet as the positioning ratchet moves with respect to the base.

With the bicycle operating device according to the eighteenth aspect, it is possible to operate a cable operated component with the bicycle operating device.

In accordance with a nineteenth aspect of the present disclosure, the bicycle operating device according to any one of the first to eighteenth aspects further comprises a first user operated input movably arranged with respect to the base between a first rest position and a first operated position. The first user operated input is operatively coupled to the pulling pawl to move the positioning ratchet with respect to the base in the first direction as the first user operated input moves from the first rest position towards the first operated position.

With the bicycle operating device according to the nineteenth aspect, it is possible to easily perform a pulling operation.

In accordance with a twentieth aspect of the present disclosure, the bicycle operating device according to the nineteenth aspect is configured so that the positioning ratchet and the first user operated input are pivotally mounted with respect to the base about a common pivot axis.

With the bicycle operating device according to the twentieth aspect, it is possible to make the bicycle component operating device compact.

In accordance with a twenty-first aspect of the present disclosure, the bicycle operating device according to any one of the first to twentieth aspects further comprises a release movably disposed with respect to the base between a first position and a second position. The release moves the positioning pawl from the holding position to the releasing position as the release moves from the first position towards the second position.

With the bicycle operating device according to the twenty-first aspect, it is possible to reliably perform a releasing operation.

In accordance with a twenty-second aspect of the present disclosure, the bicycle operating device according to the twenty-first further comprises a second user operated input movably arranged with respect to the base between a second rest position and a second operated position. The second user operated input is operatively coupled to the release. The second user operated input moves the release from the first position towards the second position as the second user operated input moves from the second rest position towards the second operated position.

With the bicycle operating device according to the twenty-second aspect, it is possible to easily perform a releasing operation.

In accordance with a twenty-third aspect of the present disclosure, the bicycle operating device according to any one of the first to twenty-second aspects further comprises a handlebar attachment coupled to the base.

With the bicycle operating device according to the twenty-third aspect, it is possible to attach the bicycle operating device to a handlebar to improve the operability of the bicycle operating device.

Also, other objects, features, aspects and advantages of the disclosed bicycle operating device will become apparent to those skilled in the art from the following detailed description, which, taken in conjunction with the annexed drawings, discloses preferred embodiments of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
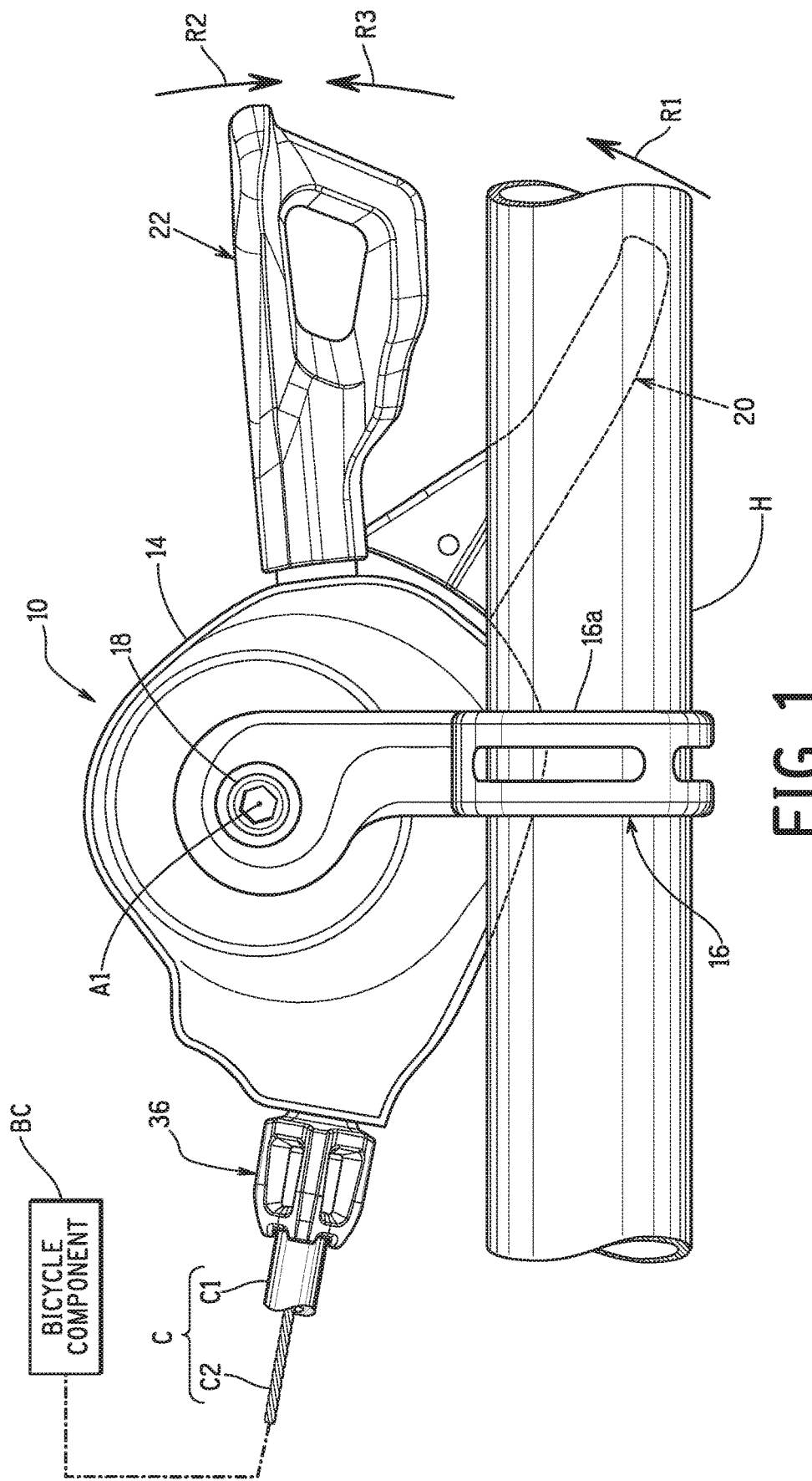
FIG. 1 is a top plan view of a portion of a handlebar of a bicycle equipped with a bicycle operating device in accordance with one illustrative embodiment.

Referring initially to FIG. 1, a portion of a handlebar H of a bicycle is shown that is equipped with a bicycle operating device 10 in accordance with one illustrative embodiment. The bicycle operating device 10 is arranged, for example, on a right side of the handlebar H so as to be operated by a rider's right hand. Alternatively, the bicycle operating device 10 can be constructed as a mirror image and arranged on a left side of the handlebar H. The bicycle operating device 10 is adjustably mounted to the handlebar H in a longitudinal direction of the handlebar H.

In the illustrated embodiment, the bicycle operating device 10 is configured to be operatively coupled to a bicycle component BC via a control cable C. In the illustrated embodiment, the bicycle operating device 10 is configured as a gear shifter for controlling a gear position of a gear changing device such as a derailleur or an internally geared hub. However, the bicycle component operating device 10 can be used as a bicycle control device for operating other types of bicycle components (e.g., a suspension, an adjustable seatpost, etc.) as needed and/or desired.

Figure 2:
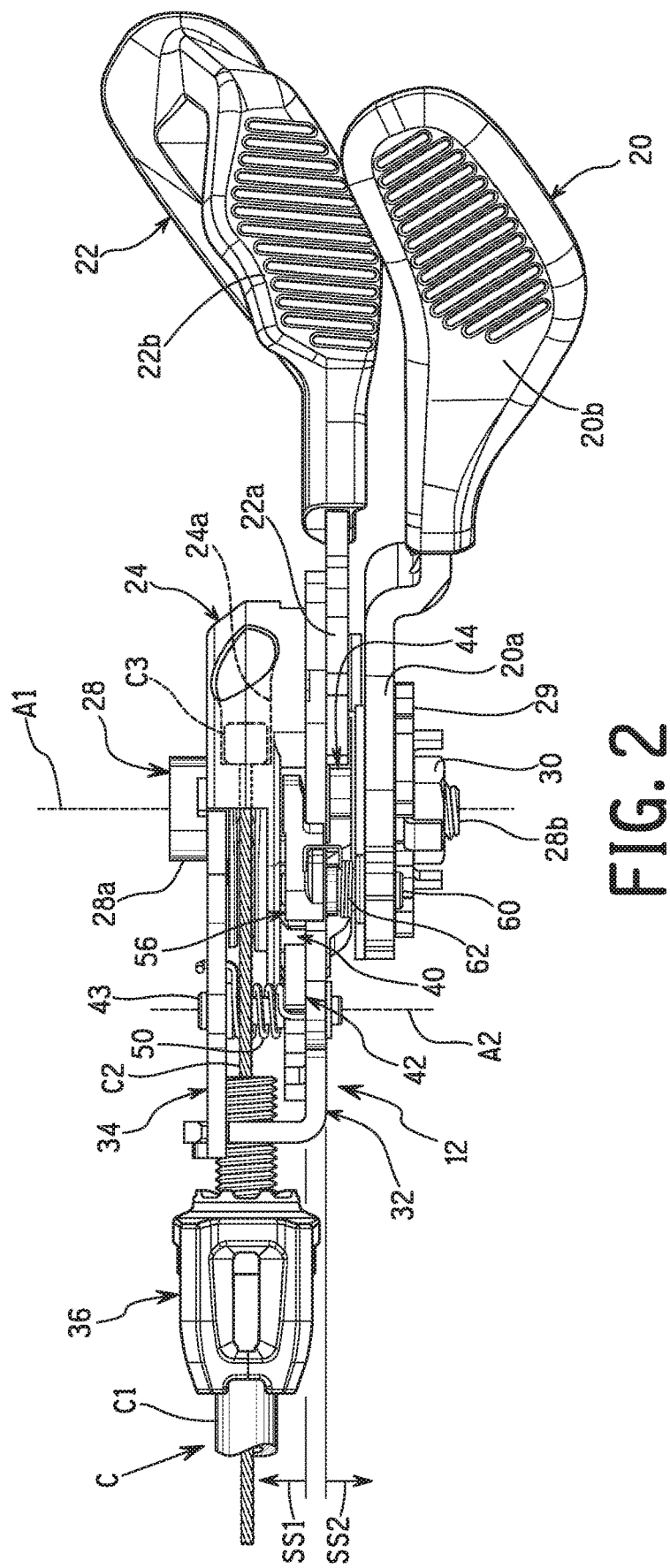
FIG. 2 is a side elevational view of the bicycle operating device illustrated in FIG. 1 with a housing and a handlebar attachment of the bicycle operating device has been removed to reveal the internal parts of the bicycle operating device.

Preferably, as seen in FIG. 2, the control cable C is a conventional bicycle operating cable that has an outer case C1 covering an inner wire C2. In other words, the control cable C is a Bowden type cable in which the inner wire C2 is slidably received within the outer case C1. The inner wire C2 has a cable nipple or attachment barrel C3 for attaching the inner wire C2 to the bicycle component operating device 10 as discussed below. The bicycle component operating device 10 operates the bicycle component BC by selectively pulling and releasing the inner wire C2.

Figure 3:
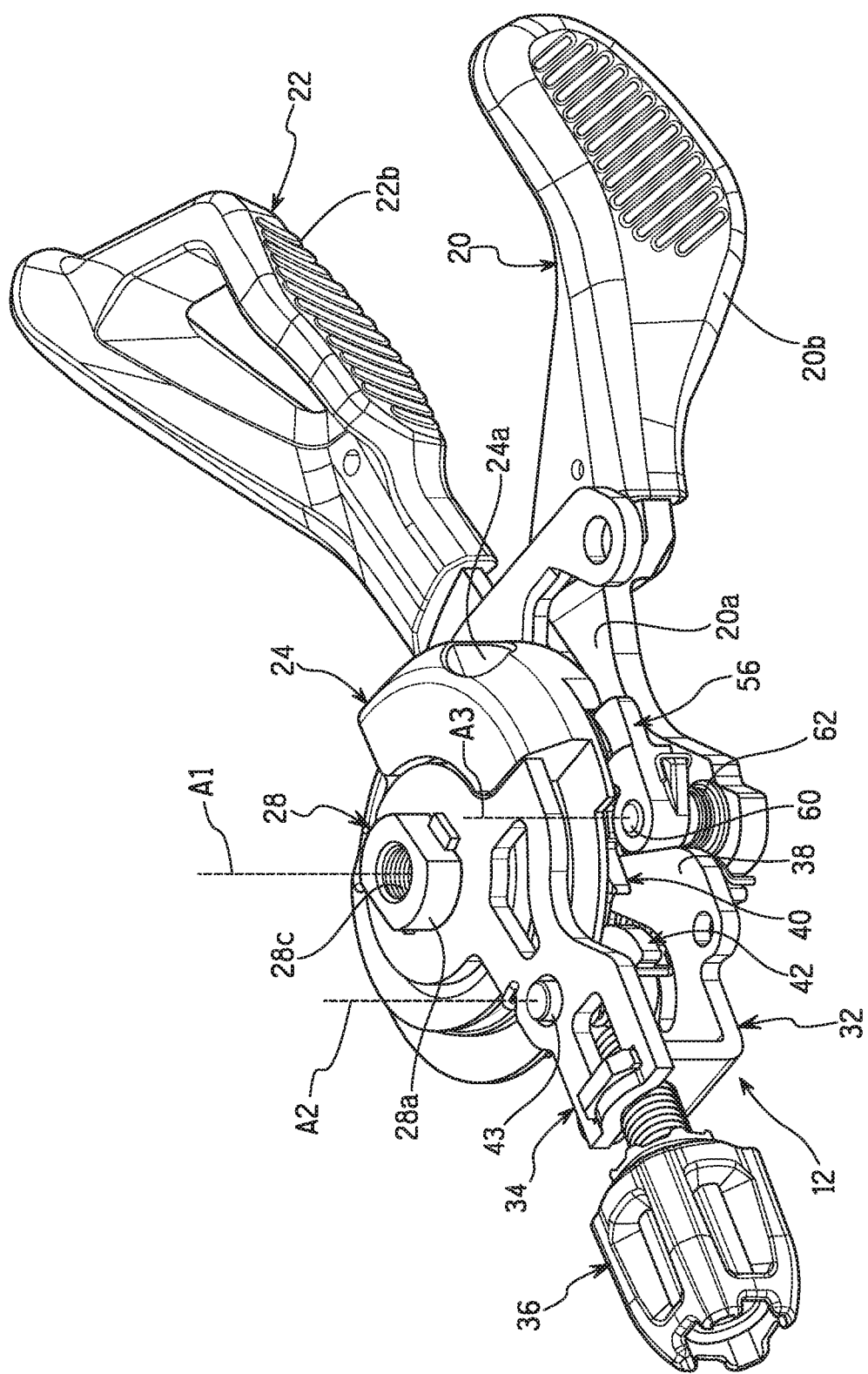
FIG. 3 is a perspective view of the internal parts of the bicycle operating device illustrated in FIG. 2.

Referring to FIGS. 1 to 3, the bicycle operating device 10 comprises a base 12. The base 12 is a stationary support part that supports internal parts of the bicycle operating device 10. Here, the bicycle operating device 10 further comprises a housing 14 (see FIG. 1) that covers the base 12 and the internal parts (see FIGS. 2 and 3) of the bicycle operating device 10 that release from the inner wire C2 to feed out of the housing 14 and that pull the inner wire C2 into the housing 14. Here, for example, the housing 14 has a two-piece construction that are coupled together by fasteners (e.g., screws) that are not shown. The parts of the housing 14 are hard rigid members that are constructed of a suitable material such as a hard plastic or a lightweight metal such as aluminum. However, the housing 14 can have a variety of configurations as needed and/or desired. While the housing 14 is described as a separate element from the base 12, the housing 14 can be considered part of the base 12 in that the housing 14 is a stationary support part that is integrated with the base 12.

Referring to FIG. 1, the bicycle operating device 10 further comprises a handlebar attachment 16 that is coupled to the base 12. The handlebar attachment 16 is removably attached to the base 12 by a fixing bolt 18 as seen in FIG. 1. Also, the handlebar attachment 16 can be adjustably mounted to the housing 14 as needed and/or desired. While the handlebar attachment 16 is described as a separate element from the base 12, the handlebar attachment 16 can be considered part of the base 12 in that the handlebar attachment 16 is a stationary support part that is integrated with the base 12. The handlebar attachment 16 is configured to be mounted to the handlebar H in a conventional manner. The handlebar attachment 16 is preferably made of a strong rigid material such as a metallic material or a reinforced resin material. Here, the handlebar attachment 16 has a handlebar clamp 16a and a tightening bolt (not shown) for tightening the handlebar clamp 16a around the handlebar H. While the handlebar clamp 16a is shown as a one-piece, unitary member (i.e., a non-hinged clamp), the handlebar clamp 16a can be a hinged clamp having a pair of curved jaws pivotally connected at one end and adjustably coupled by a bolt at the other end.

As seen in FIGS. 1 to 4, the bicycle operating device 10 further comprises a first user operated input 20 that is movably arranged with respect to the base 12 between a first rest position and a first operated position. Basically, the first user operated input 20 is moved in a first operating direction R1 from the first rest position towards the first operated position for performing a cable pulling operation of the inner wire C2 with respect to the base 12. Here, the first user operated input 20 includes an attachment portion 20a that is disposed inside the housing 14 and a lever portion 20b that extends outside of the housing 14 from the attachment portion 20a. The attachment portion 20a is pivotally attached to the base 12. The lever portion 20b is arranged such that the user moves the lever portion 20b to pivot the first user operated input 20 with respect to the base 12. The attachment portion 20a and the lever portion 20b are, for example, formed of a single metal piece with the lever portion 20b having a plastic user contact portion molded thereon as shown.

The bicycle operating device 10 further comprises a second user operated input 22 that is movably arranged with respect to the base 12 between a second rest position and a second operated position. Basically, the second user operated input 22 is moved in a second operating direction R2 from the second rest position towards the second operated position for performing a cable releasing operation of the inner wire C2 with respect to the base 12. In addition, the second user operated input 22 is moved in a third operating direction R3 from the second rest position towards the second operated position for performing a cable releasing operation of the inner wire C2 with respect to the base 12. Thus, as explained below, the second user operated input 22 has two of the second operated positions. Here, the second user operated input 22 includes an attachment portion 22a that is disposed inside the housing 14 and a lever portion 22b that extends outside of the housing 14 from the attachment portion 22a. The attachment portion 22a is pivotally attached to the base 12. The lever portion 22b is arranged such that the user moves the lever portion 22b to pivot the second user operated input 22 with respect to the base 12. The attachment portion 22a and the lever portion 22b are, for example, formed of a single metal piece with the lever portion 22b having a plastic user contact portion molded thereon as shown.

Figure 4:
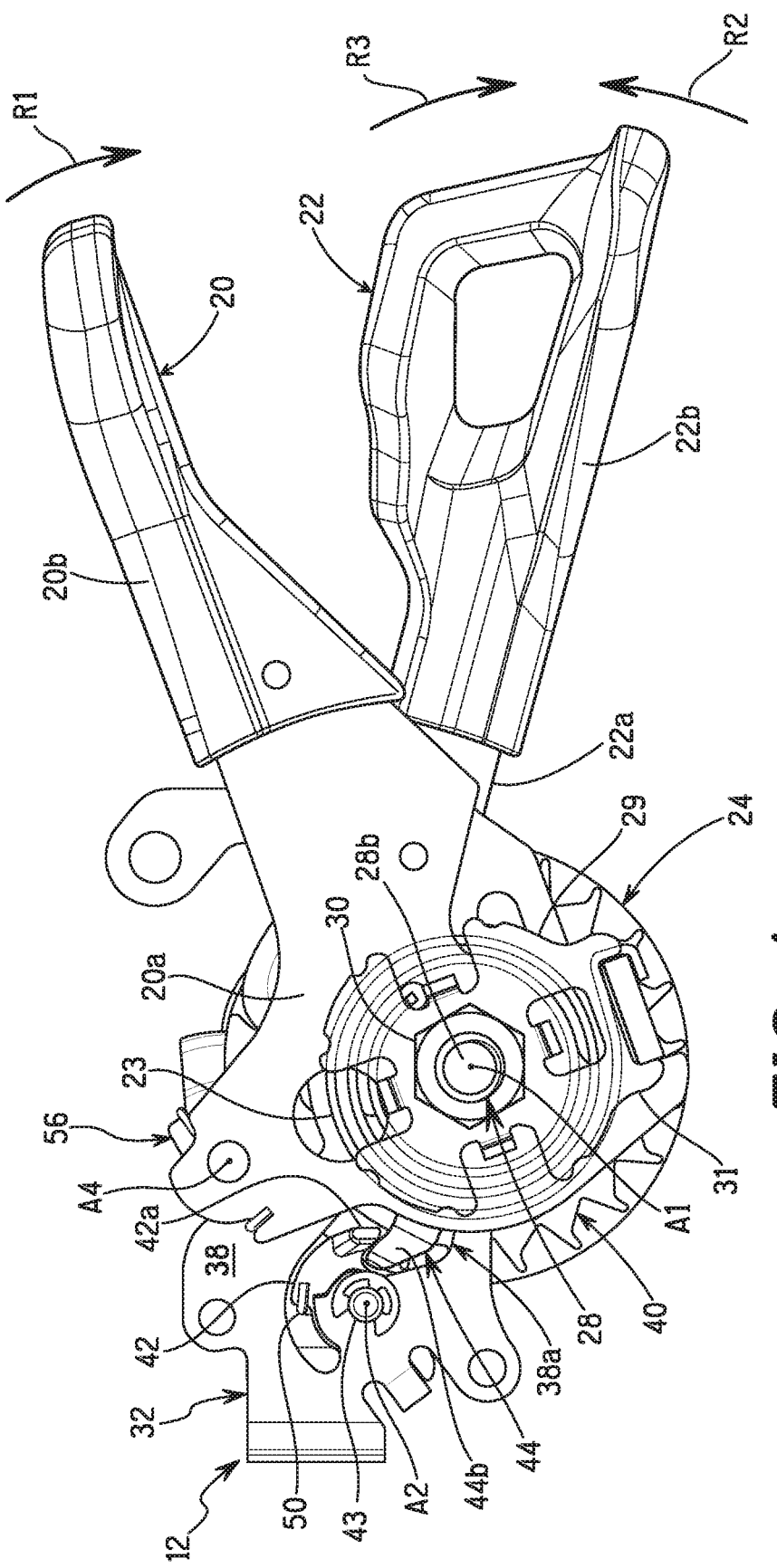
FIG. 4 is a bottom plan view of the internal parts of the bicycle operating device illustrated in FIGS. 2 and 3.

Preferably, the first user operated input 20 is biased towards the first rest position by a biasing element 23 as seen in FIG. 4. For example, the biasing element 23 is a torsion spring having a first free end hooked onto the base 12 and a second free end hooks onto the first user operated input 20. Likewise, preferably, the second user operated input 22 is biased towards the second rest position as will be discussed below. As used herein, the term "rest position" refers to a state in which a part (e.g., the first and second user operated inputs 20 and 22) remains stationary without the need of a user holding the part in that state. Basically, the first user operated input 20 is operated by a user to pull the inner wire C2 into the housing 16, while the second user operated input 22 is operated by a user to feed out the inner wire C2 from the housing 16.

As seen in FIGS. 2 and 3, the bicycle operating device 10 further comprises a wire takeup 24. The wire takeup 24 includes a cable holder 24a. The inner wire C2 is attached to the cable holder 24a of the wire takeup 24 by the cable attachment barrel C3. The wire takeup 24 is pivotally mounted to the base 12 as discussed below. The wire takeup 24 pivots with to the base 12 in a first direction D1, which corresponds to a cable pulling direction, and pivots with to the base 12 in a second direction D2, which corresponds to a cable releasing direction.

Figure 5:
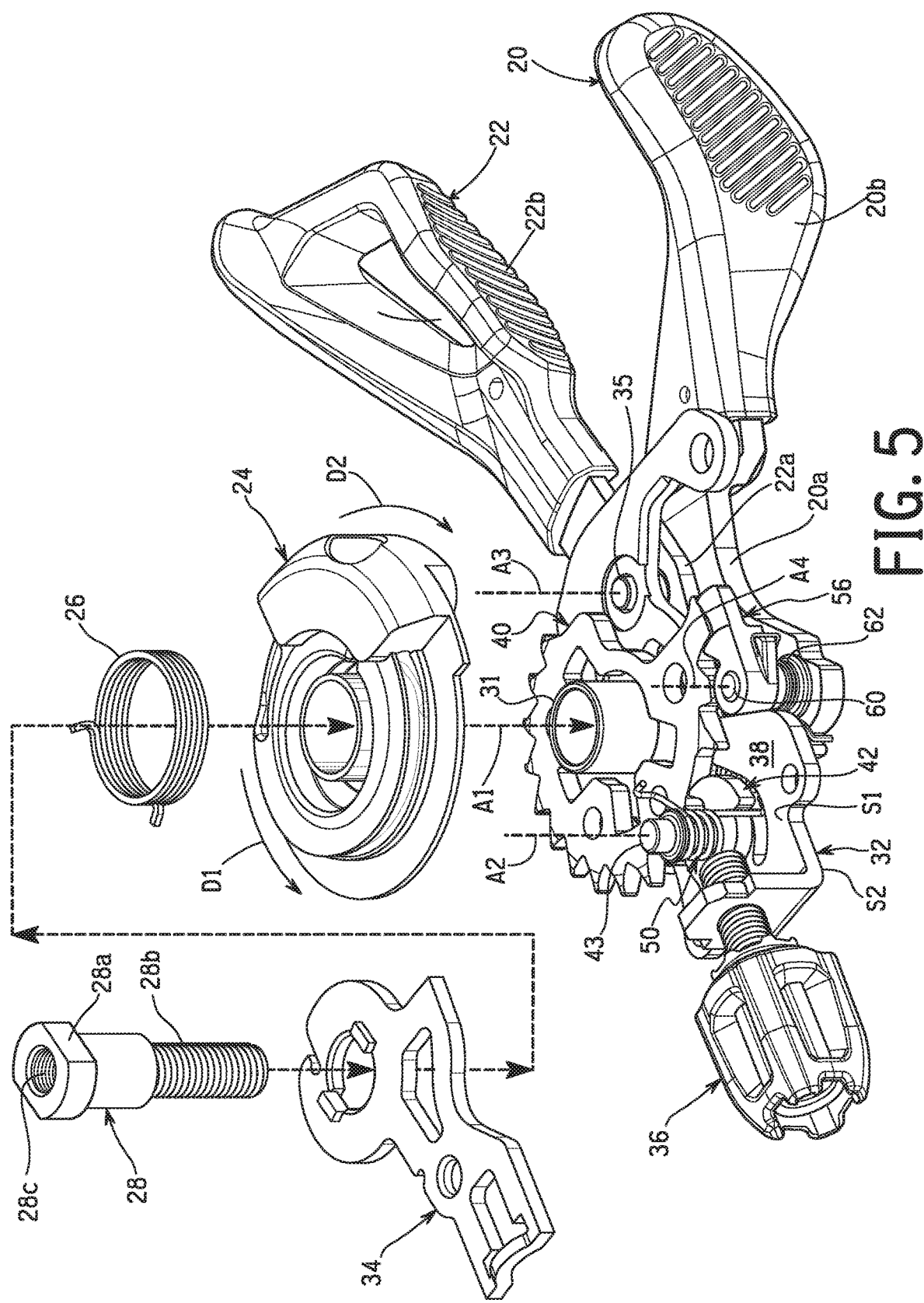
FIG. 5 is a partially exploded perspective view of selected parts of the bicycle operating device illustrated in FIGS. 1 to 4.
Figure 6:
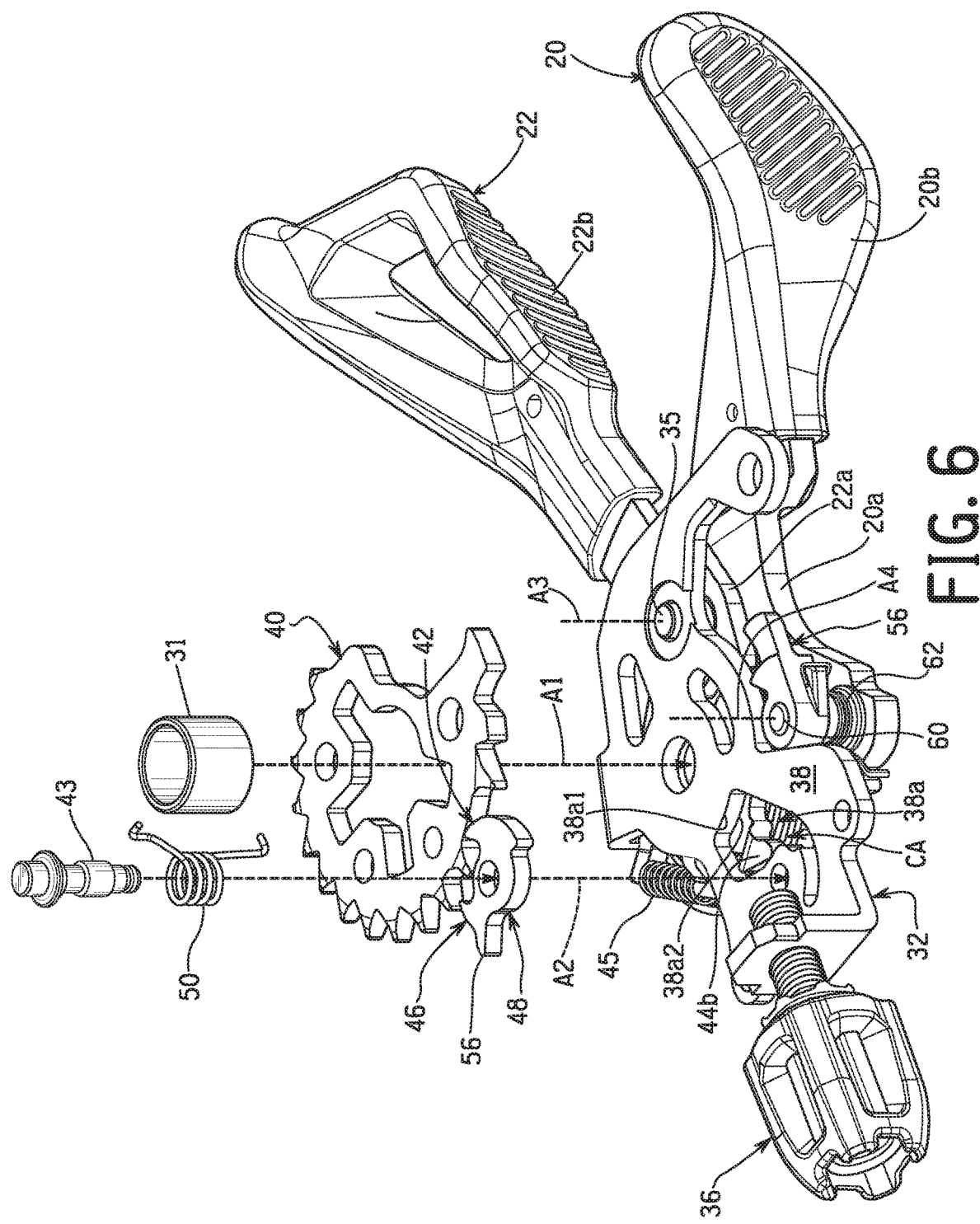
FIG. 6 is a partially exploded perspective view of selected parts of the bicycle operating device illustrated in FIGS. 1 to 4.
Figure 7:
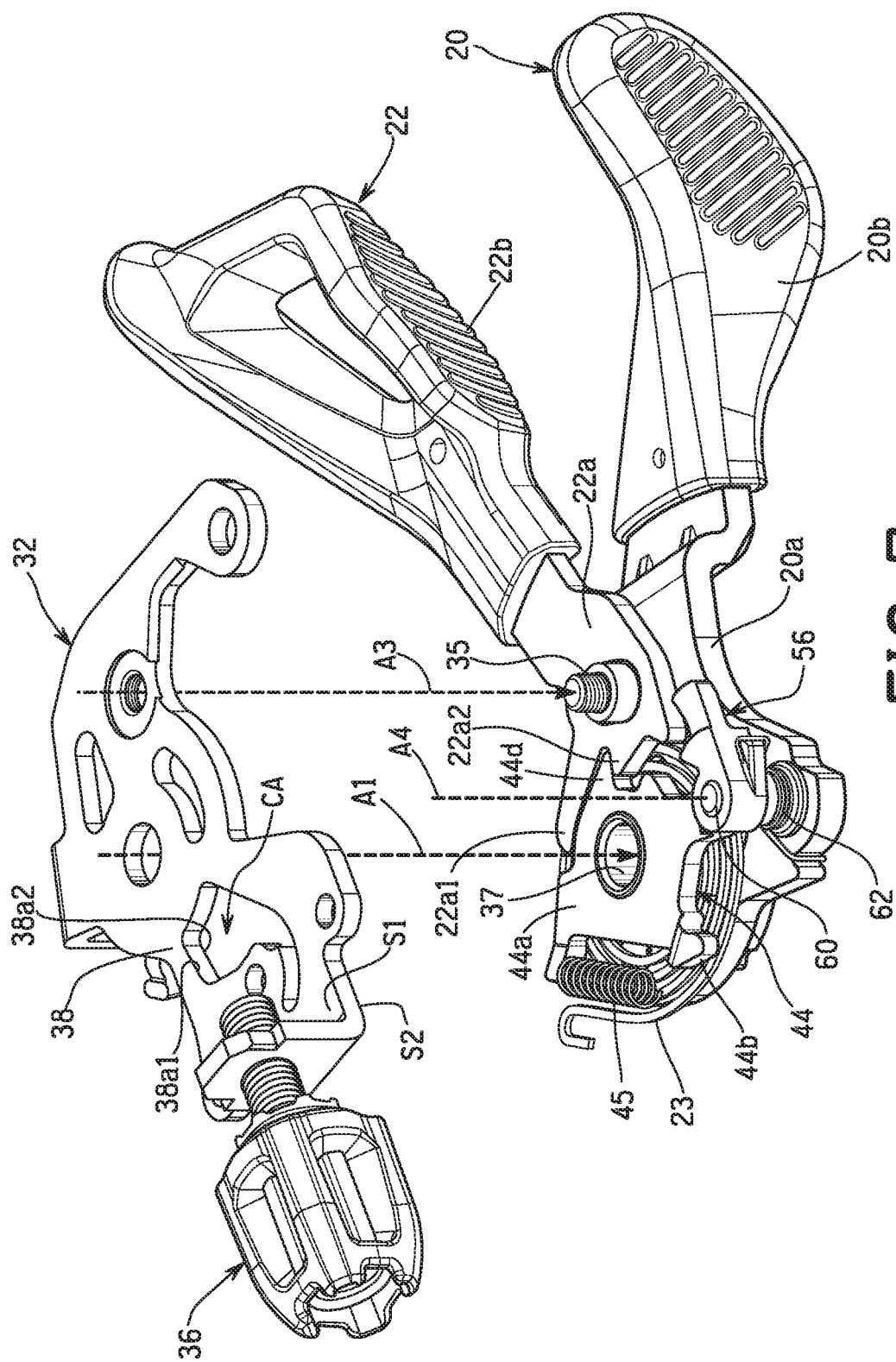
FIG. 7 is a partially exploded perspective view of selected parts of the bicycle operating device illustrated in FIGS. 1 to 4.
Figure 8:
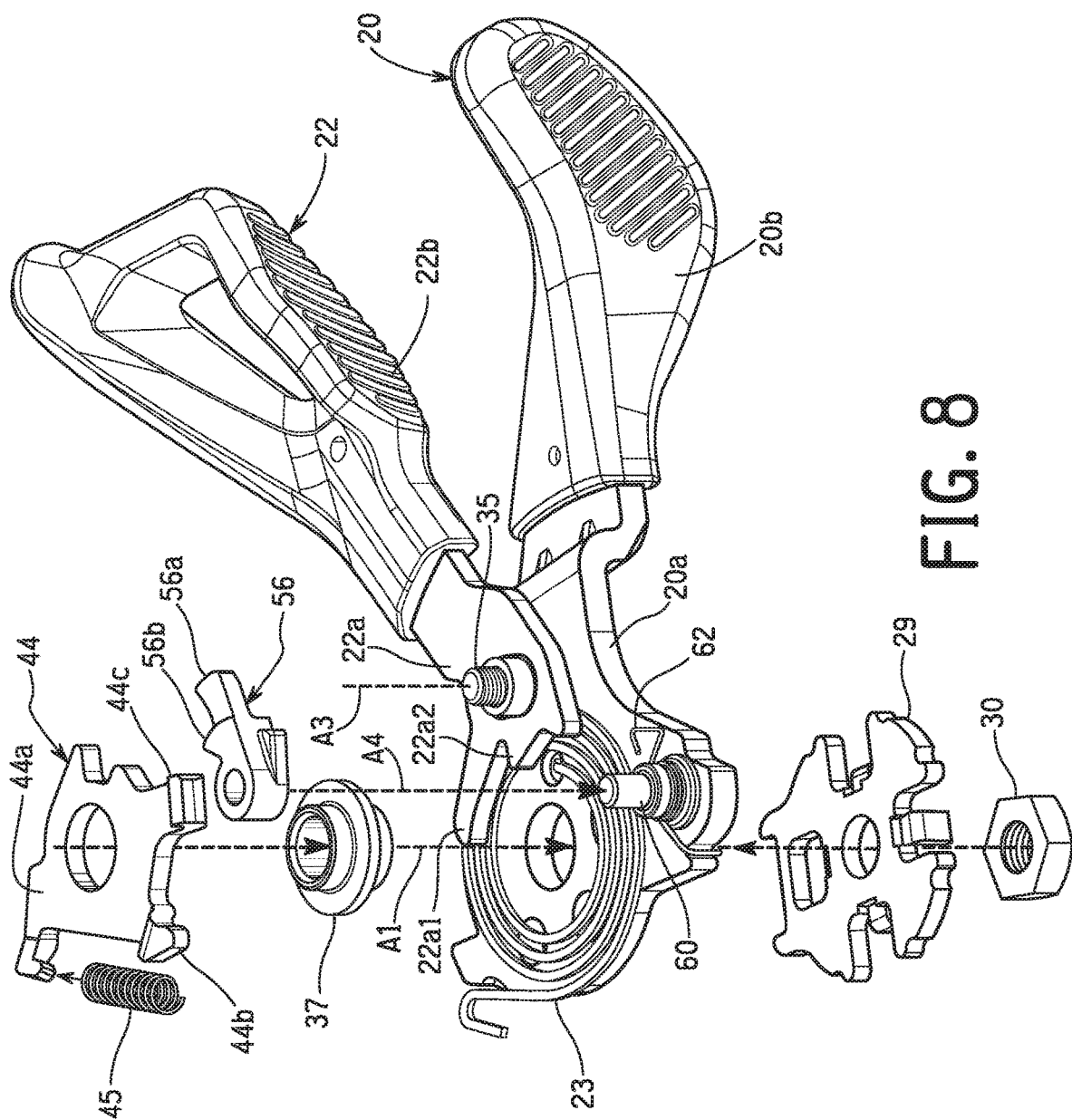
FIG. 8 is a partially exploded perspective view of selected parts of the bicycle operating device illustrated in FIGS. 1 to 4.
Figure 9:
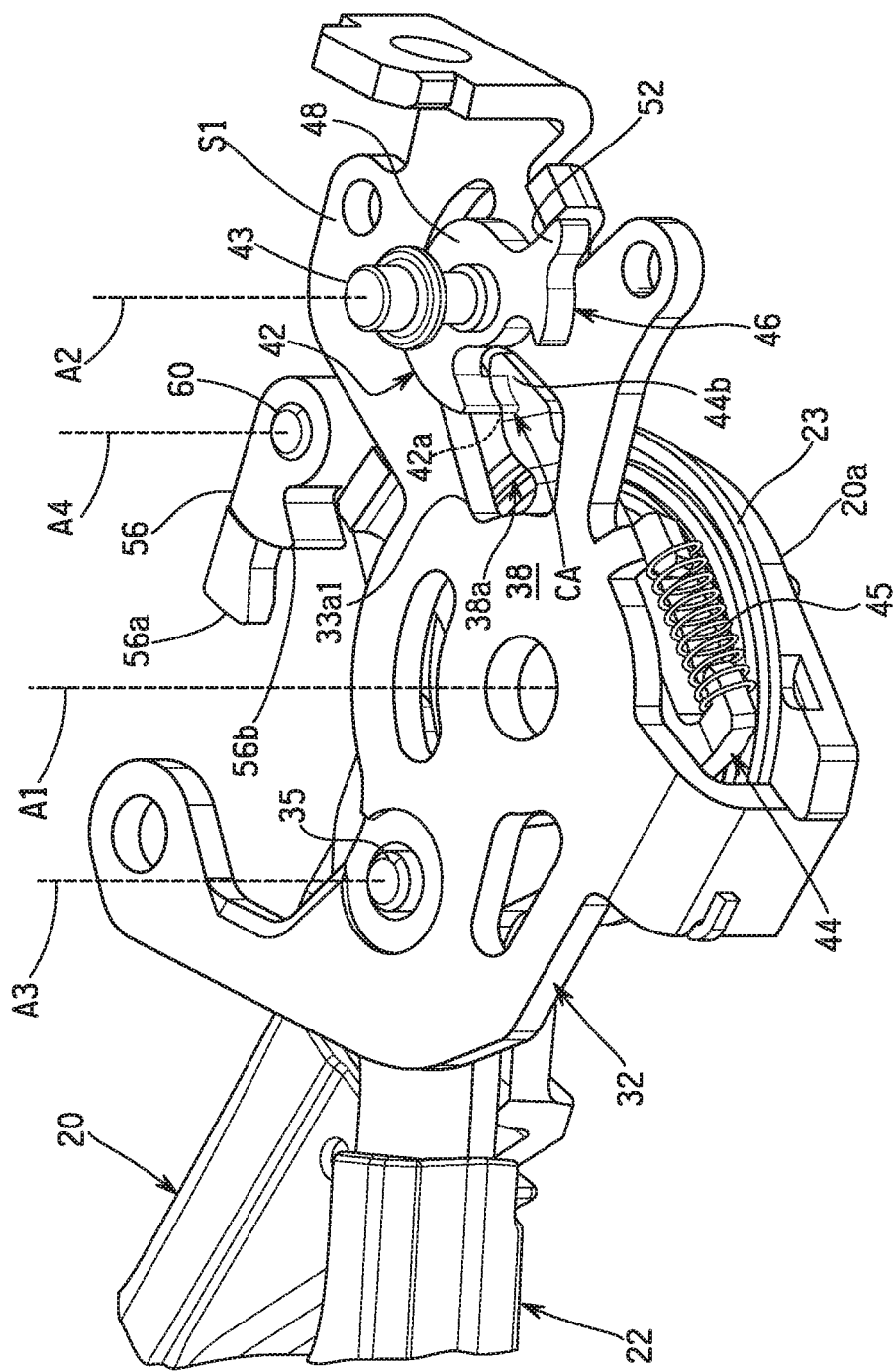
FIG. 9 is an enlarged perspective view of selected parts of the bicycle operating device illustrated in FIGS. 1 to 4 used for performing a cable releasing operation.

As seen in FIG. 5, a biasing element 26 is provided between the base 12 and the wire takeup 24 to biasing the wire takeup 24 in the second direction D2. Here, the biasing element 26 is a coiled torsion spring having a first free end engaged in a notch of the wire takeup 24 and a second free end of the biasing element 26 engaged in a notch of the base 12. The biasing element 26 is preferably preloaded to bias the wire takeup 24 in the second direction D2 against an abutment of the base 12.

As the first user operated input 20 is moved from the first rest position (see FIG. 12) towards the first operated position (see FIG. 14), the wire takeup 24 is moved to pull the inner wire C2 of the control cable C with respect to the base 12. On the other hand, as the second user operated input 22 is moved from the second rest position (see FIG. 19) towards the second operated position (see FIG. 20 or FIG. 21), the wire takeup 24 is moved to release the inner wire C2 of the control cable C with respect to the base 12. Thus, the wire takeup 24 is connected to the inner wire C2 of the control cable C of the bicycle component BC (FIG. 1). In this way, the bicycle operating device 10 is configured to pull the inner wire C2 with respect to the base 12 in response to a cable pulling operation of the first user operated input 20 and releases the inner wire C2 with respect to the base 12 in response to a cable releasing operation of the second user operated input 22. Thus, the bicycle operating device 10 constitutes a bicycle cable operating device.

As seen in FIGS. 2 and 3, the base 12 includes a shaft 28 that pivotally supports the first user operated input 20 and the wire takeup 24 for pivotal movement with respect to the base 12 about a center axis A1 (hereinafter referred to as "first axis A1") of the shaft 28. In this way, the shaft 28 acts as a pivot shaft or axle for pivotally support the first user operated input 20 and the wire takeup 24 with respect to the base 12. Thus, the first user operated input 20 is pivotally mounted to the base 12 to pivot between the first rest position (see FIG. 12) and the first operated position (see FIG. 14).

In the illustrated embodiment, the shaft 28 is a mounting bolt that has a head portion 28a, an externally threaded shaft portion 28b and an internally threaded bore 28c. Here, the attachment portion 20a of the first user operated input 20 is pivotally supported on the shaft 28. The lever portion 20b is arranged such that the user moves the lever portion 20b in the first operating direction R1 to pivot the first user operated input 20 about the shaft 28. A washer 29 is provided on the threaded shaft portion 28b of the shaft 28 and a fixing nut 30 is screwed onto the externally threaded shaft portion 28b of the shaft 28 to couple the shaft 28 to the base 12. The fixing bolt 18 is threaded into the internally threaded bore 28c of the shaft 28 for securing the handlebar clamp 16 to the shaft 28. Preferably, a bushing 31 is provided on the shaft 28 and the wire takeup 24 is provided on the bushing 31. The biasing element 23 and the biasing element 26 have their coiled portions arranged to wrapped around the shaft 28. In this way, the biasing element 23 and the biasing element 26 are supported on the base 12.

As seen in FIGS. 2 to 5, the base 12 further includes a base plate 32. Here, the base 12 further includes a support plate 34 that is a separate part from the base plate 32. The bushing 31 also acts as a spacer between the base plate 32 to the support plate 34 such that the wire takeup 24 can pivot about the bushing 31. The base plate 32 and the support plate 34 are coupled together by the shaft 28. In particular, the fixing nut 30 is screwed onto the externally threaded shaft portion 28b of the shaft 28 to couple the base plate 32 to the support plate 34. The shaft 28 pivotally supports the first user operated input 20 to the base plate 32 on a side of the base plate 32 that is opposite to the wire takeup 24. Here, the shaft 28, the base plate 32 and the support plate 34 are stationary support members that are disposed inside the housing 14 and form an internal support. The base plate 32 also pivotally supports the second user operated input 22 via a support pin 35 that is screwed into a thread hole of the base plate 32. Here, the base plate 32 is also provided with a barrel adjuster 36 that projects outside of the housing 14 as seen in FIG. 1. The barrel adjuster 36 is adjustably coupled to the base plate 32 to variably fix a contact point of an end of the outer case C1 relative to the base 12. Also, a bushing 37 is provided between on the shaft 28 to pivotally support the first user operated input 20 with respect to the base plate 32.

The base plate 32 and the support plate 34 are hard, rigid members that are constructed of suitable materials such as a lightweight metal (e.g., aluminum). For example, the base plate 32 and the support plate 34 are each formed by stamping and bending a metal sheet to the desired shape. However, the base plate 32 and the support plate 34 can be formed from a single metal sheet that is bent to the desired shape. In other words, the base plate 32 can be formed from a single metal sheet or can be formed from several pieces connected together. As mentioned above, the base plate 32 and the support plate 34 are fixedly connected together by the shaft 28 and the nut 30.

Figure 10:
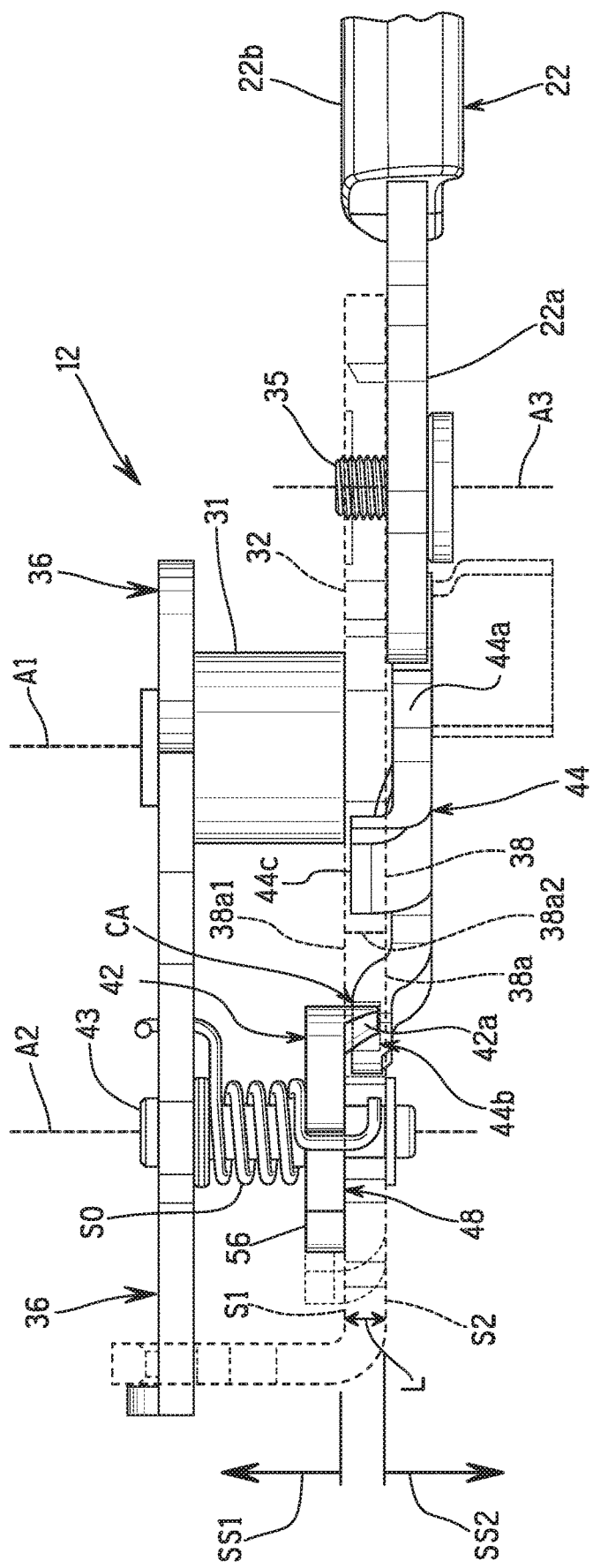
FIG. 10 is a side elevational view of selected parts of the bicycle operating device illustrated in FIGS. 1 to 4 used for performing a cable releasing operation.

As seen in FIG. 10, the base 12 includes a base plate 32 having a first surface S1 and a second surface S2. The second surface S2 is opposite the first surface S1. The base plate 32 has a base thickness L between the first surface S1 and the second surface S2. The base thickness L is between one millimeter and five millimeters. More preferably, the base thickness L is between one millimeter and three millimeters. In the illustrated embodiment, the base thickness 1.8 millimeters. The base plate 32 includes an inner wall 38 defining a through hole 38a having a first opening 38a1 at the first surface S1 and a second opening 38a2 at the second surface S2. The inner wall 38 also defines the first surface S1 and the second surface S2. The inner wall 38 also defines a first surface side SS1 of the base plate 32 and a second surface side SS2 of the base plate 32. The first surface side SS1 of the base plate 32 corresponds to a side of the base plate 32 with the first surface S1. The second surface side SS2 of the base plate 32 corresponds to a side of the base plate 32 with the second surface S2. The wire takeup 24 is disposed on the first surface side SS1 of the base plate 32, while the first user operated input 20 and the second user operated input 22 are disposed on the second surface side SS2 of the base plate 32.

To effectuate positioning of the wire takeup 24, the bicycle operating device 10 further comprises a positioning ratchet 40 and a positioning pawl 42. The positioning ratchet 40 and the positioning pawl 42 are both disposed on the first surface side SS1 of the base plate 32. Basically, the positioning ratchet 40 is non-movably coupled to the wire takeup 24 such that the wire takeup 24 and the positioning ratchet 40 move as a unit with respect to the base 12. The positioning ratchet 40 and the first user operated input 20 are pivotally mounted with respect to the base 12 about a common pivot axis. In this illustrated embodiment, the common pivot axis corresponds to the first axis A1, which is the center axis of the shaft 28. The positioning ratchet 40 is movably disposed with respect to the base 12 in the first direction D1 and the second direction D2 that is opposite to the first direction D1. In other words, the wire takeup 24 is arranged to move together with the positioning ratchet 40 as the positioning ratchet 40 moves with respect to the base 12. Here, the positioning ratchet 40 includes a plurality of ratchet teeth 40a that are selectively engaged and disengaged with the positioning pawl 42 to position the wire takeup 24 with respect to the base 12.

Figure 12:
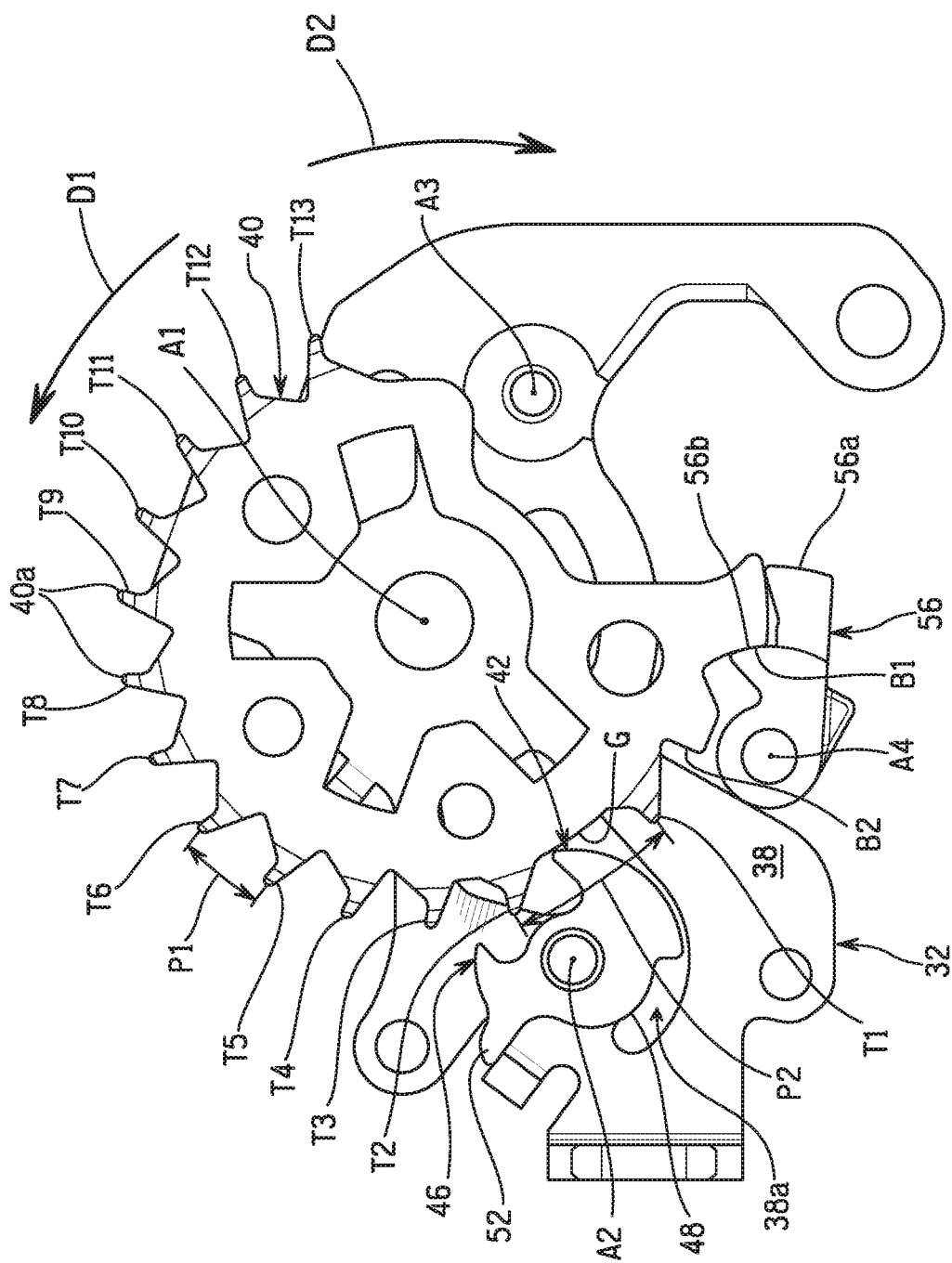
FIG. 12 is a top plan view of selected parts of the bicycle operating device illustrated in FIGS. 1 to 4 shown a full released position of a positioning ratchet that corresponds to a first ratchet position of a plurality of ratchet positions.

As seen in FIG. 12, in addition to the ratchet teeth 40a, the positioning ratchet 40 includes a first abutment B1 and a second abutment B2. The ratchet teeth 40a include a first ratchet tooth T1, a second ratchet tooth T2, a third ratchet tooth T3, a fourth ratchet tooth T4, a fifth ratchet tooth T5, a sixth ratchet tooth T6, a seventh ratchet tooth T7, an eighth ratchet tooth T8, a ninth ratchet tooth T9, a tenth ratchet tooth T10, an eleventh ratchet tooth T11, a twelfth ratchet tooth T12 and a thirteenth ratchet tooth T13. The first ratchet tooth T1 is different from the second ratchet tooth T2. The second ratchet tooth T2 is next to the first ratchet tooth T1. More specifically, the ratchet teeth T1 to T13 are sequentially arranged in that order in a circumferential direction of the positioning ratchet 40 with respect to the first axis A1. The abutment B1 and the second abutment B2 are sequentially arranged before the ratchet teeth T1 to T13 in that order in a circumferential direction of the positioning ratchet 40 with respect to the first axis A1.

Here, at least three of the ratchet teeth 40a are equally spaced apart by a first predetermined pitch interval P1 and at least one of the ratchet teeth 40a that is different from the three of the ratchet teeth 40a is spaced apart from an adjacent one of the ratchet teeth 40a by a second predetermined pitch interval P2 that is larger than the first predetermined pitch interval P1. In particular, in the illustrated embodiment, a spacing or gap G is defined between the first ratchet tooth T1 and the second ratchet tooth T2. Thus, the first ratchet tooth T1 and the second ratchet tooth T2 are spaced apart by the second predetermined pitch interval P2, while the spacing between the remaining ratchet teeth T2 to T13 are equally spaced apart by the first predetermined pitch interval P1. The abutment B1 and first ratchet tooth T1 are also spaced apart by the first predetermined pitch interval P1.

Figure 13:
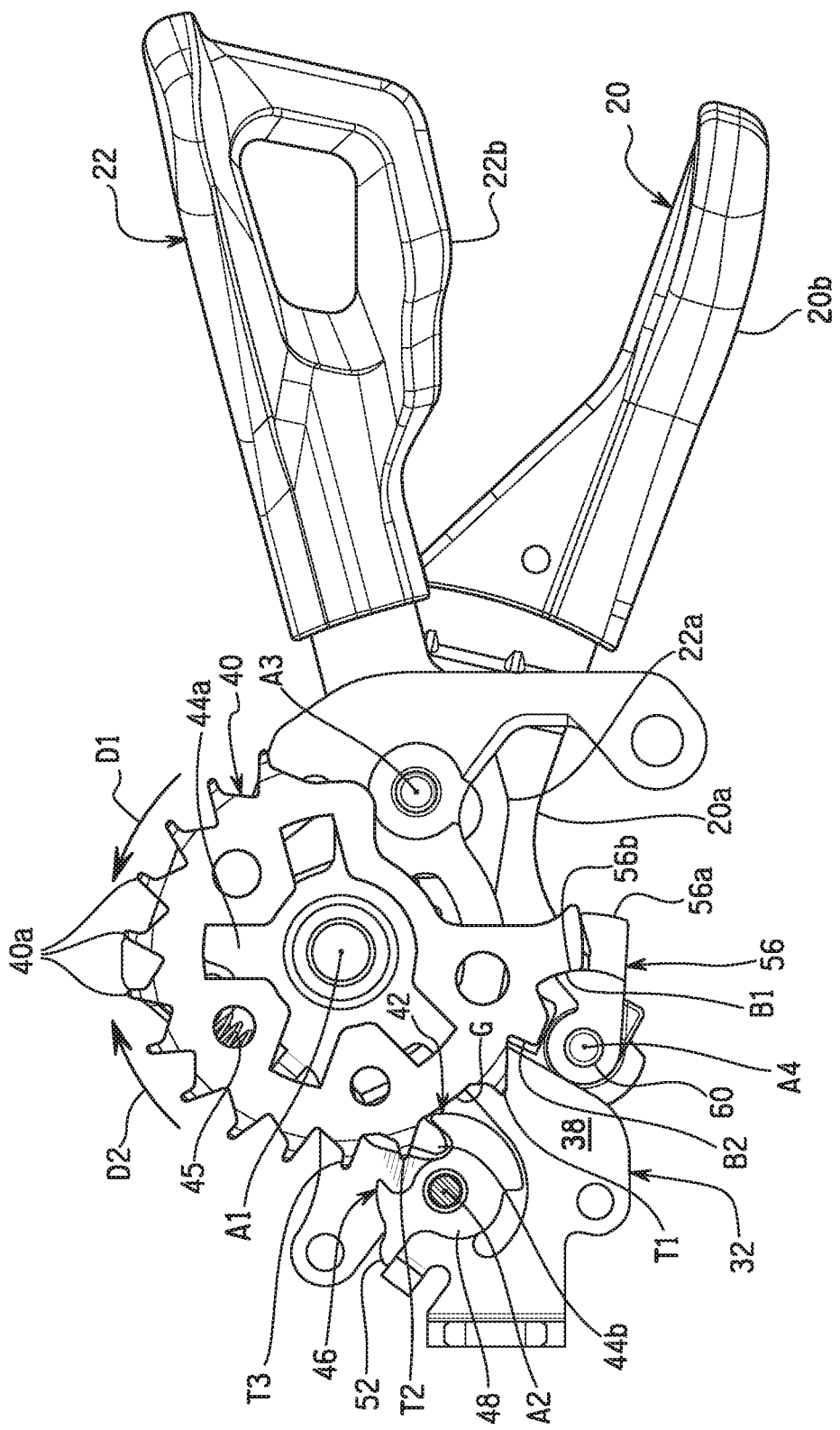
FIG. 13 is a top plan view of selected parts of the bicycle operating device illustrated in FIGS. 1 to 4 used for performing a cable pulling operation in which first and second user operated inputs are in first and second rest positions, respectively, and a positioning ratchet is in the first ratchet position.

On the other hand, the positioning pawl 42 is movably mounted on the base 12 to selectively engage the positioning ratchet 40 for maintaining a ratchet position of the positioning ratchet 40 with respect to the base 12 and to be selectively disengaged from the positioning ratchet 40 for permitting movement of the positioning ratchet 40 with respect to the base 12. More specifically, the positioning pawl 42 is movably disposed with respect to the base 12 between a holding position and a releasing position. Here, the positioning pawl 42 is pivotally mounted on a support shaft 43 that is supported between the base plate 32 and the support plate 34. In other words, the positioning pawl 42 is pivotally mounted to the base plate 32 on a second axis A2 that is parallel to the first axis A1. The second axis A2 is defined by a center longitudinal axis of the support shaft 43. The positioning pawl 42 engages the positioning ratchet 40 to selectively establish a plurality of predetermined positions of the positioning ratchet 40 with respect to the base 12 while the positioning pawl 42 is in the holding position. Preferably, as in the illustrated embodiment, the positioning ratchet 40 has at least twelve of the predetermined positions that are established by the positioning pawl 42 selectively engaging to the positioning ratchet 40. The positioning pawl 42 is disengaged from the positioning ratchet 40 to permit the positioning ratchet 40 to move with respect to the base 12 in the second direction D2 while the positioning pawl 42 is in the releasing position. As seen in FIGS. 12 and 13, the positioning pawl 42 is configured to not engage the ratchet teeth 40a of the positioning ratchet 40 while the positioning ratchet 40 is in a fully released position in the second direction D2.

Figure 20:
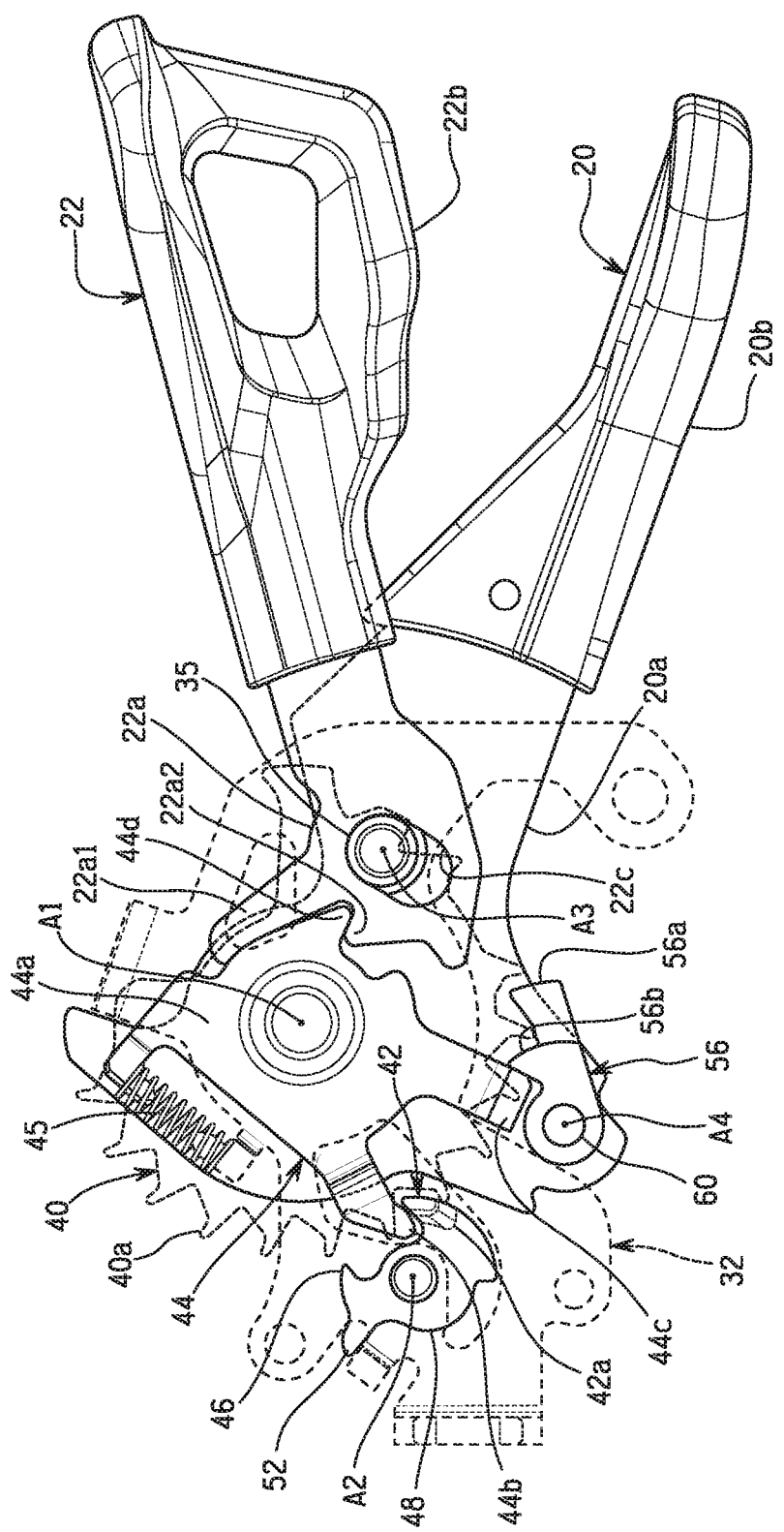
FIG. 20 is a top plan view of the selected parts of the bicycle operating device illustrated in FIGS. 13 to 19 but in which the base plate and the positioning ratchet are shown in broken lines, and in which the first and second user operated inputs are in the first and second rest positions, respectively, and the positioning ratchet is in the sixth ratchet position.
Figure 21:
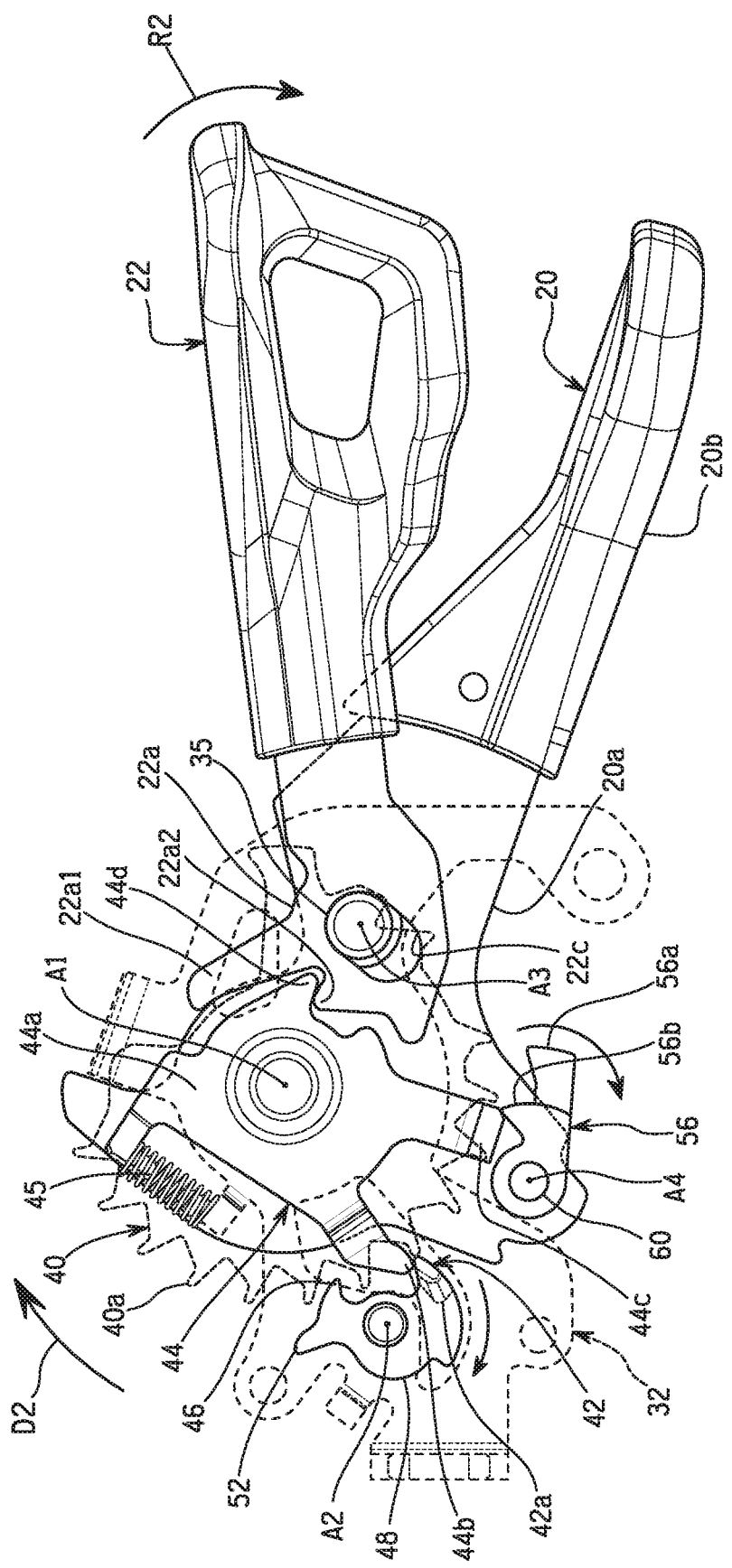
FIG. 21 is a top plan view of the selected parts of the bicycle operating device illustrated in FIG. 20 but in which the second user operated input has been moved from the second rest position towards a first of the second operated positions to perform a cable releasing operation from the sixth ratchet position to the fifth ratchet position.
Figure 22:
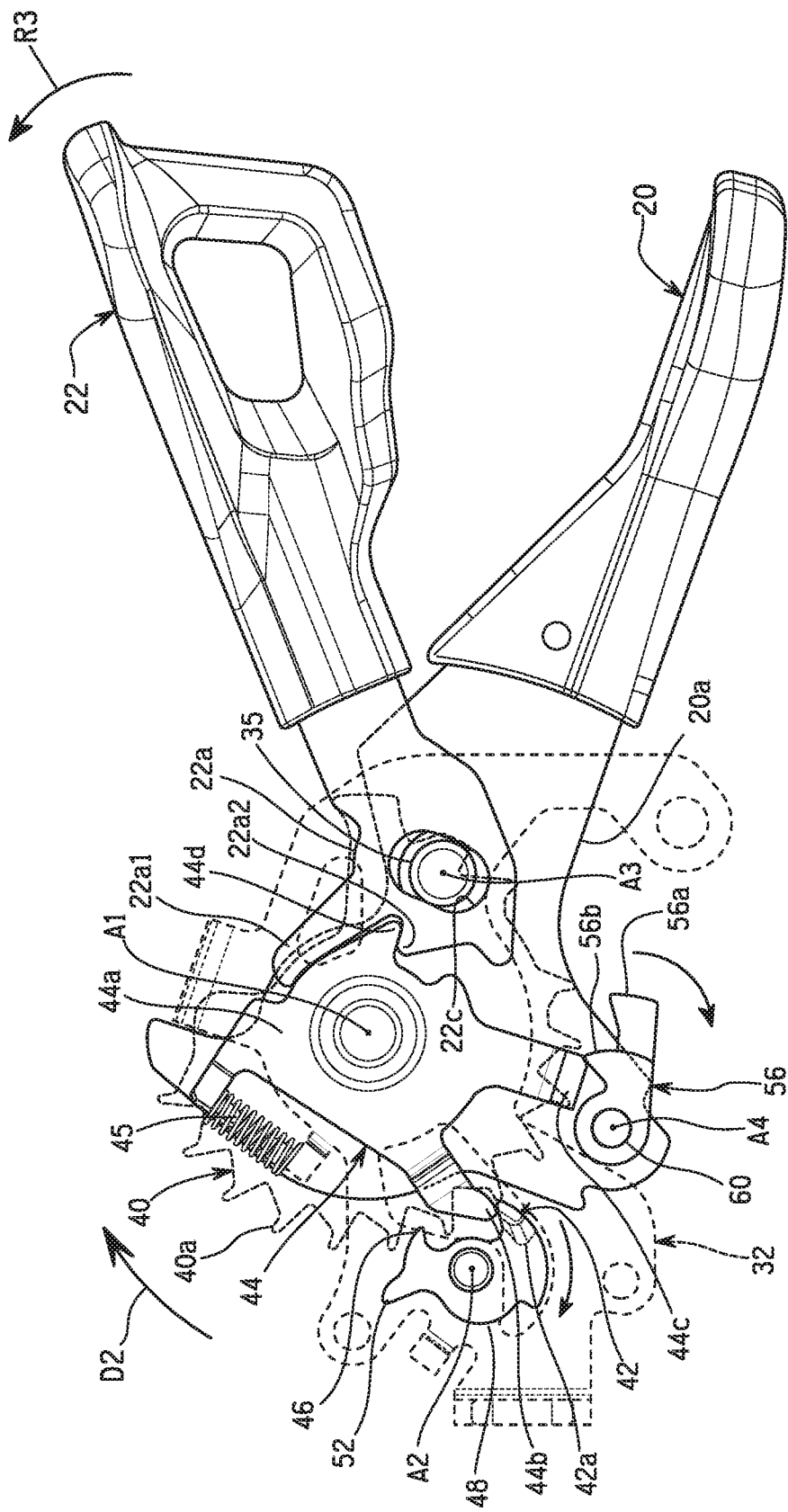
FIG. 22 is a top plan view of the selected parts of the bicycle operating device illustrated in FIGS. 20 and 21 but in which the second user operated input has been moved from the second rest position towards a second of the second operated positions to perform a cable releasing operation from the sixth ratchet position to the fifth ratchet position.

To effectuate a cable releasing operation of the wire takeup 24, the bicycle operating device 10 further comprises a release 44 that is movably disposed with respect to the base 12 between a first position (FIGS. 11 and 20) and a second position (FIGS. 21 and 22). The second user operated input 22 is operatively coupled to the release 44 such that movement of the second user operated input 22 form the second rest position to the second operated position pivots the release 44. In the illustrated embodiment, the release 44 is pivotally mounted to the base plate 32 on the first axis A1. Specifically, the release 44 is pivotally supported on the bushing 37 that is provided on the shaft 28. On the other hand, the second user operated input 22 is movably supported on the base plate 32 by the support pin 35, which defines a third axis A3. The third axis A3 is parallel to the first axis A1 and the second axis A2.

Figure 11:
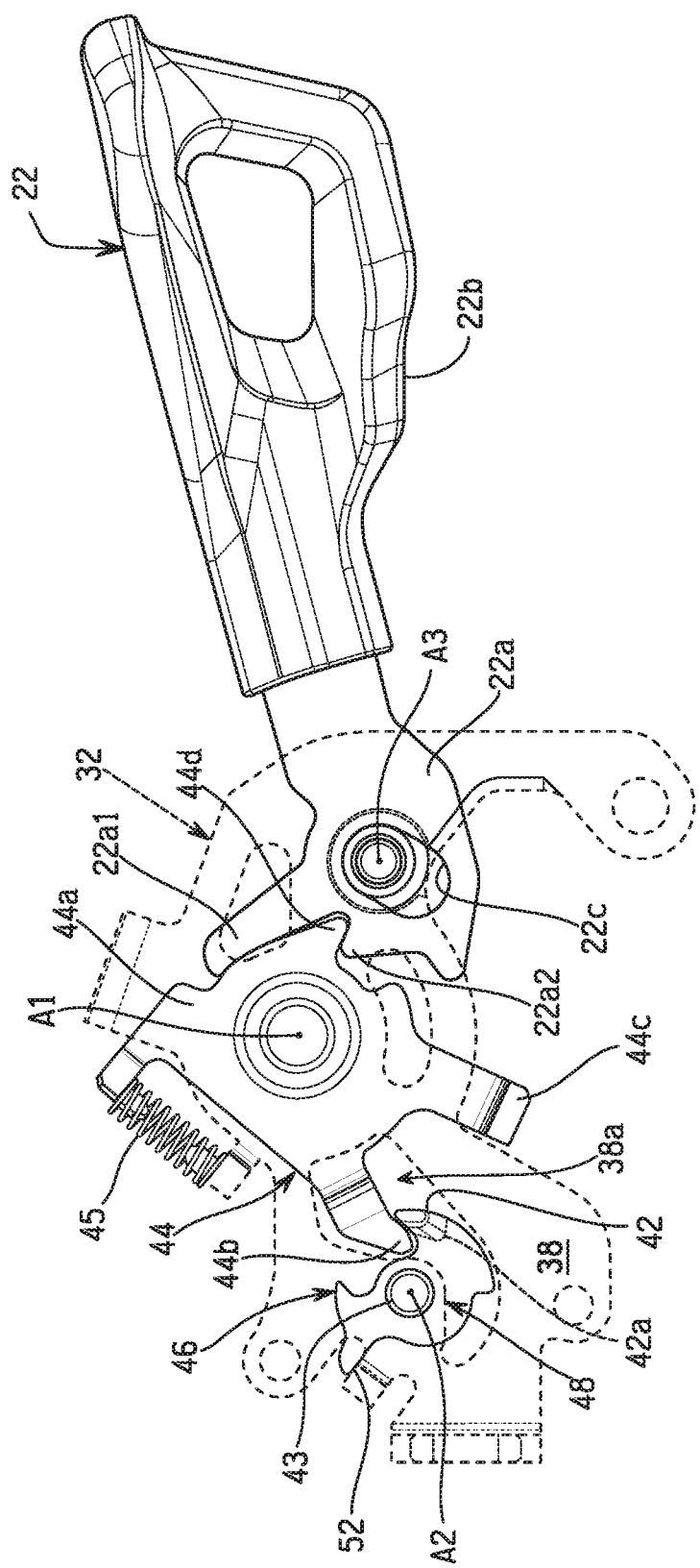
FIG. 11 is a top plan view of selected parts of the bicycle operating device illustrated in FIGS. 1 to 4 used for performing a cable releasing operation.

Basically, the release 44 moves the positioning pawl 42 from the holding position to the releasing position as the release 44 moves from the first position towards the second position. In this way, the positioning ratchet 40 can move with respect to the base 12 in the second direction D2 while the release 44 is in the second position and holding the positioning pawl 42 in the releasing position. The release 44 is biased towards the first position as seen in FIGS. 11 and 20. In particular, a biasing element 45 is provided between the base plate 32 and the release 44 to biasing the release 44 in the second direction D2. Here, the biasing element 45 is a coiled compression spring having a first free end engaged with an abutment of the release 44 and a second free end engaged in an abutment of the base plate 32. The biasing element 45 also acts as a return spring for the second user operated input 22. In other words, the second user operated input 22 is biased to the second rest position by the biasing element 45.

As seen in FIG. 10, the release 44 contacts the positioning pawl 42 at a contact area CA disposed between the first surface S1 and the second surface S2 while the release 44 is in the second position. The contact area CA is entirely disposed between the first surface S1 and the second surface S2. In other words, the release 44 contacts the positioning pawl 42 in the contact area CA, which is entirely located within the base thickness L of the inner wall 38. The release 44 includes a support portion 44a that is movably mounted to the base plate 32. In particular, the support portion 44a of the release 44 is pivotally supported on the bushing 37 that is provided on the shaft 28. The support portion 44*a* is disposed on a second surface side SS2 of the base plate 32. In other words, the support portion 44*a* is located on the opposite side of the inner wall 38 from the positioning ratchet 40.

The release 44 further includes an extension 44*b* extending from the support portion 44*a* into the contact area CA. Thus, the extension 44*b* of the release 44 extends out of the plane of the support portion 44*a* of the release 44 and into a plane of the inner wall 38. As explained below, the extension 44*b* of the release 44 is configured to contact the positioning pawl 42 in response to operation of the second user operated input 22 from the second rest position towards the second operated position. Thus, the second user operated input 22 is operatively coupled to the release 44. In particular, the second user operated input 22 moves the release 44 from the first position towards the second position as the second user operated input 22 moves from the second rest position towards the second operated position. In other words, the second user operated input 22 is operatively coupled to the positioning pawl 42 via the release 44 so as to move the positioning pawl 42 from the holding position to the releasing position in response to operation of the second user operated input 22. Here, the release 44 further includes an abutment 44*c* and a projection 44*d*. The abutment 44*c* and the projection 44*d* will be explained below.

Preferably, the bicycle operating device 10 further comprises a stop pawl 46 that is movably disposed with respect to the base 12 between a non-stopping position and a stopping position. The stop pawl 46 is provided to ensure that the positioning ratchet 40 moves only one of the predetermined positions with a single progressive movement of the second user operated input 22 from the second rest position towards the second operated position. In the illustrated embodiment, the stop pawl 46 is pivotally mounted to the base plate 32 on the second axis A2. Specifically, in the illustrated embodiment, the stop pawl 46 and the positioning pawl 42 are connected by a mounting portion 48 that is pivotally mounted with respect to the base 12. Thus, the positioning pawl 42 includes the mounting portion 48 that is movably mounted to the base plate 32. In particular, in the illustrated embodiment, the positioning pawl 42, the stop pawl 46 and the mounting portion 48 are integrally formed as a one-piece, unitary member from a single piece. Thus, in the illustrated embodiment, the positioning pawl 42 and the stop pawl 46 pivot as a unit about the second axis A2. However, the positioning pawl 42 and the stop pawl 46 can be separate members that are independently movable if needed and/or desired. In any case, the stop pawl 46 is disposed out of a movement path of the positioning ratchet 40 in the non-stopping position. The stop pawl 46 is disposed in the movement path of the positioning ratchet 40 in the stopping position. The stop pawl 46 moves from the non-stopping position toward the stopping position in response to operation of the release 44. In other words, as the second user operated input 22 moves from the second rest position towards the second operated position, the release 44 moves from the first position towards the second position which in turn moves the stop pawl 46 from the non-stopping position toward the stopping position.

Here, the stop pawl 46 is biased towards the non-stopping position. In particular, a biasing element 50 is provided between the positioning pawl 42 and the support plate 34 to bias the stop pawl 46 towards the non-stopping position and the positioning pawl 42 towards the holding position. Preferably, the stop pawl 46 or the mounting portion 48 is provided with an abutment 52 to limit the movement of the positioning pawl 42 and the stop pawl 46 under the biasing force of the biasing element 50. In particular, the abutment 52 contacts the base plate 32 under the biasing force of the biasing element 50 when the first and second user operated inputs 20 and 22 are in the first and second rest positions, respectively. Here, the biasing element 50 is a torsion spring that is mounted on the support shaft 43. The biasing element 50 has a first free end engaged with the positioning pawl 42 and a second free end engaged in a notch of the support plate 34. In this way, the abutment 52 biased into contact with an abutment of the base plate 32 by the biasing element 50.

The positioning pawl 42 further includes a projection 42*a* projecting with respect to the mounting portion 48 into the contact area CA. The projection 42*a* is configured to be contacted by the extension 44*b* of the release 44 as the release 44 moves from the first position towards the second position. Also, as the release 44 moves from the first position towards the second position, the positioning pawl 42 is pivoted from the holding position to the releasing position. As mentioned above, the release 44 moves from the first position towards the second position in response to operation of the second user operated input 22 from the second rest position towards the second operated position. In this way, the second user operated input 22 is operatively connected to the positioning pawl 42 via the release 44 to during a cable releasing operation.

Here, the mounting portion 48 is disposed on the first surface side SS1 of the base plate 32. In other words, the mounting portion 48 of the positioning pawl 42 is located on the opposite side of the inner wall 38 from the support portion 44*a* of the release 44. In this way, the mounting portion 48 of the positioning pawl 42 is offset from the support portion 44*a* of the release 44 in an axial direction of the first axis A1. Preferably, the projection 42*a* and the mounting portion 48 are one-piece unitary member. More preferably, the projection 42 is provided by press working. The positioning pawl 42 is biased towards the holding position. In particular, as mentioned above, the biasing element 50 biases positioning pawl 42 is biased towards the holding position.

To effectuate a cable pulling operation of the wire takeup 24, the bicycle operating device 10 further comprises a pulling pawl 56. The first user operated input 20 is operatively coupled to the pulling pawl 56 to move the positioning ratchet 40 with respect to the base 12 in the first direction D1 as the first user operated input 20 moves from the first rest position towards the first operated position. More specifically, the pulling pawl 56 is pivotally mounted on the attachment portion 20*a* of the first user operated input 20 by a support shaft 60. The support shaft 60 defines a fourth axis A4 that is parallel to the first axis A1.

As seen in the illustrated embodiment in FIG. 12, the positioning ratchet 40 includes more than of the four ratchet teeth 40*a* that are configured to contact the positioning pawl 42, the stopping pawl 46 and the pulling pawl 56. Basically, the positioning ratchet 40 is configured to rotate around the first axis A1. The positioning pawl 42 and the stopping pawl 46 pivot around the second axis A2, while the pulling pawl 56 pivots around the fourth axis A4. The second axis A2 and the fourth axis A4 are positioned within a ninety-degree range about the first axis A1. The second axis A2 and the fourth axis A4 are preferably positioned almost the same distance from the first axis A1 (±2 millimeters). In this way, the pulling pawl 56 is positioned along a moving path in the first direction D1 (the cable pulling direction) away from the positioning pawl 42 so that the positioning pawl 42 and the pulling pawl 56 can be positioned closely even if the pulling pawl 56 moves the first direction D1 (the cable pulling direction).

In the illustrated embodiment, the pulling pawl 56 is biased towards engagement with the positioning ratchet 40 by a biasing element 62. In particular, the biasing element 62 is mounted on the support shaft 60. Here, the biasing element 62 is a torsion spring having a first free end engaged with the pulling pawl 56 and a second free end the attachment portion 20a of the first user operated input 20 to biasing the pulling pawl 56 towards engagement with the positioning ratchet 40.

As see in FIG. 12, the pulling pawl 56 includes a first contact part 56a and a second contact part 56b. The second contact part 56b is spaced apart from the first contact part 56a. A first liner distance between the first contact part 56a and the first axis A1 is different from a second liner distance between the second contact part 56b and the first axis A1. The first liner distance is longer than the second liner distance. In particular, the first contact part 56a and the second contact part 56b are located at different angular position with respect to the first axis A1. In other words, the first contact part 56a and the second contact part 56b are spaced apart with respect to the first axis A1. In this way, the first contact part 56a and the second contact part 56b are arranged to selectively contact the first and second abutments B1 and B2 and the ratchet teeth 40a during the cable pulling operations.

Basically, initially, the first contact part 56a and the second contact part 56b are arranged to contact one of the ratchet teeth 40a or one of the first and second abutments B1 and B2 in response to operation of the first user operated input 20 from the first rest position towards the first operated position. In this way, the first user operated input 20 is operatively connected to the positioning ratchet 40 via the pulling pawl 56 during a cable pulling operation. The positioning ratchet 40 is shown in a fully released position in FIG. 12. In the fully released position in FIG. 12, the second contact part 56b is engaged with the first abutment B1, while the first contact part 56a is not engaged with either of the first and second abutments B1 and B2 or any of the ratchet teeth 40a. In this embodiment, the second contact part 56b is in contact with a circumferential surface of the first abutment B1 and the second contact part 56b limits the positioning ratchet 40 to move with respect to the base 12 in the second direction D2 in the fully released position. In this embodiment, the first contact part 56a is contact with a radially outward surface of the first abutment B1 but the first contact part 56a does not limit the positioning ratchet 40 to move with respect to the base 12 in the second direction D2 in the fully released position. Also, the positioning pawl 42 is configured to not engage the ratchet teeth 40a of the positioning ratchet 40 while the positioning ratchet 40 is in a fully released position in the second direction D2.

Figure 14:
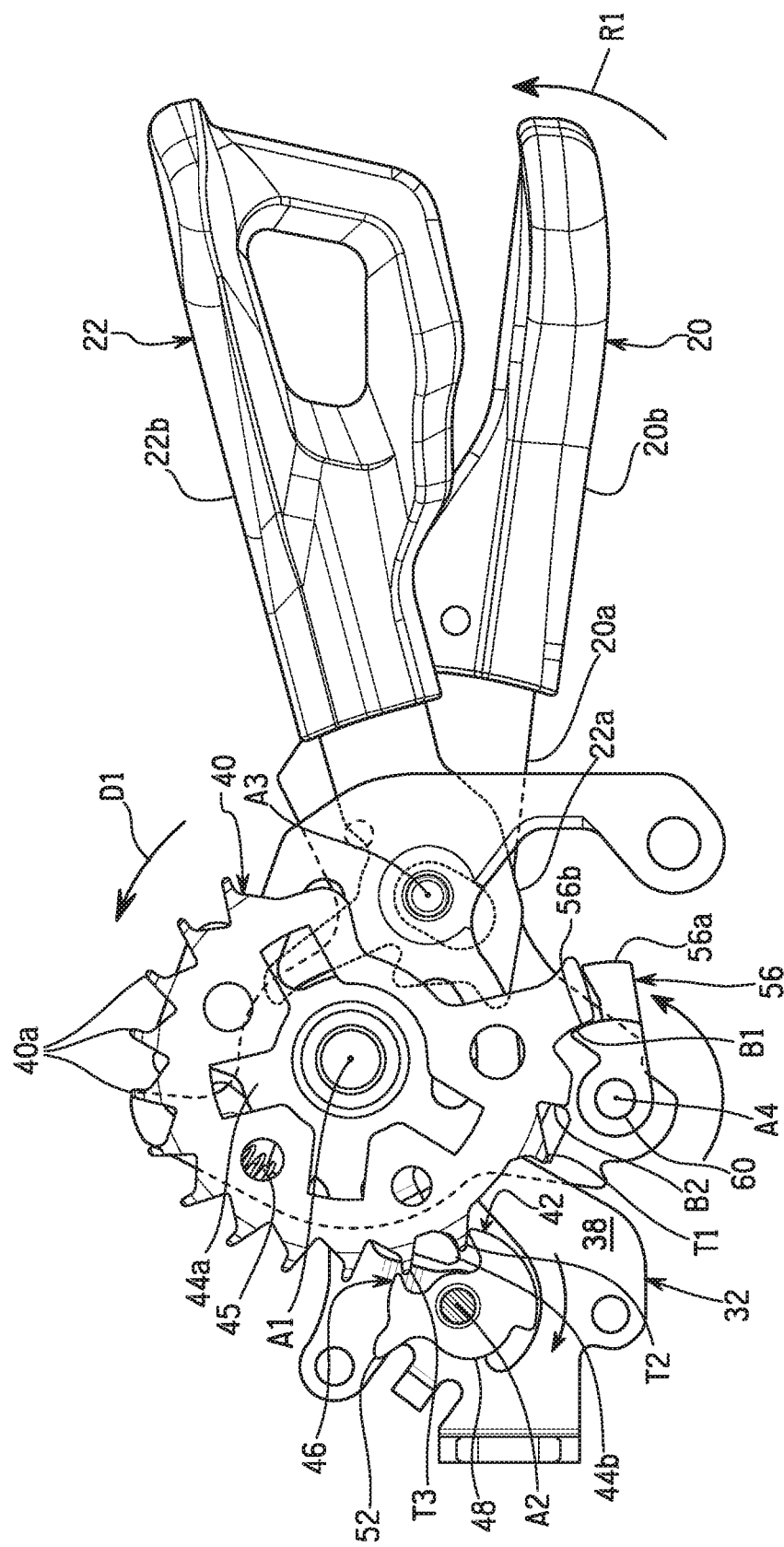
FIG. 14 is a top plan view of the selected parts of the bicycle operating device illustrated in FIG. 13 but in which the first user operated input has been moved from the first rest position towards a first operated position to perform a cable pulling operation.
Figure 15:
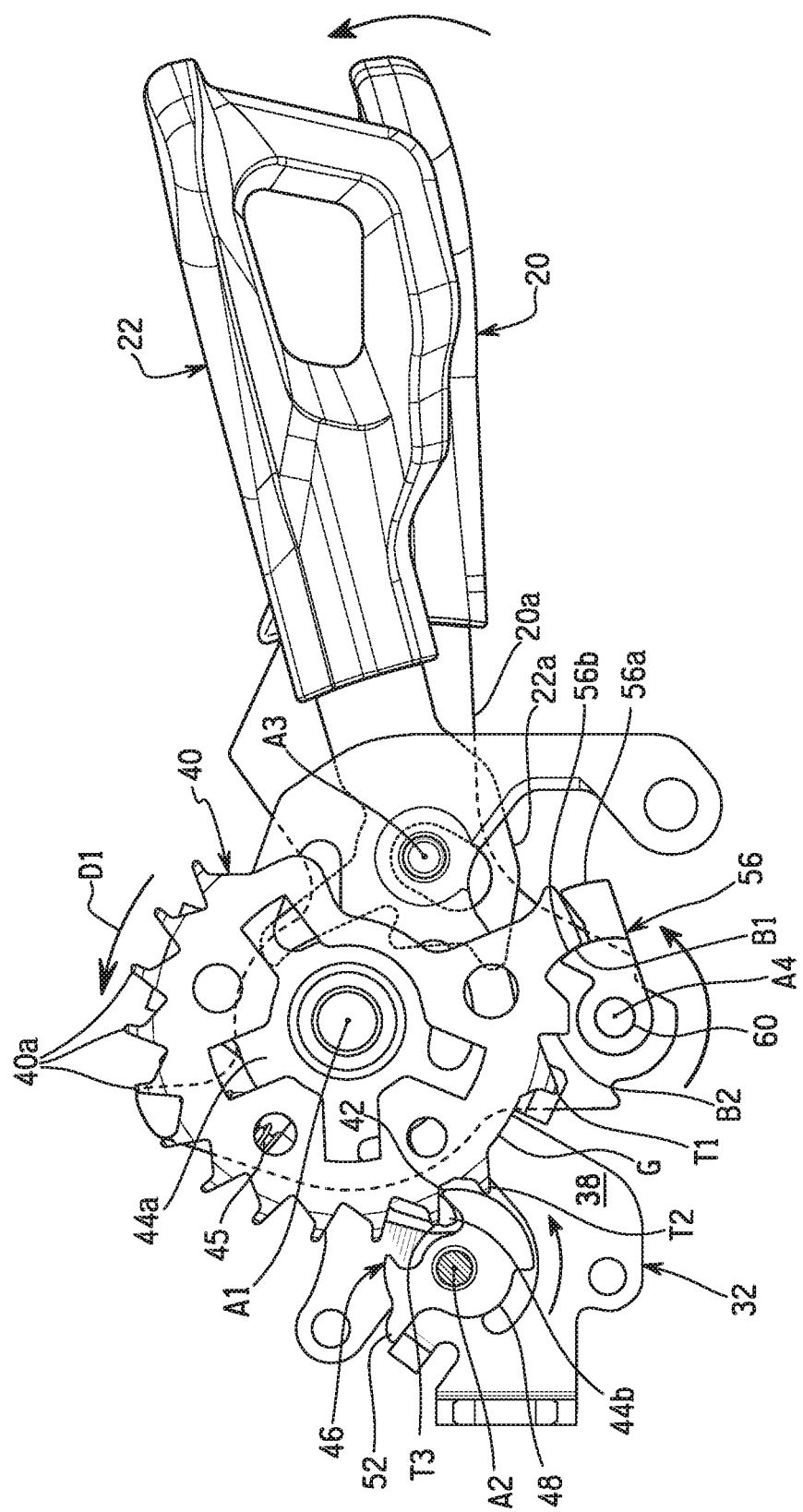
FIG. 15 is a top plan view of the selected parts of the bicycle operating device illustrated in FIGS. 13 and 14 but in which the first user operated input has been moved further to the first operated position to complete the cable pulling operation.
Figure 16:
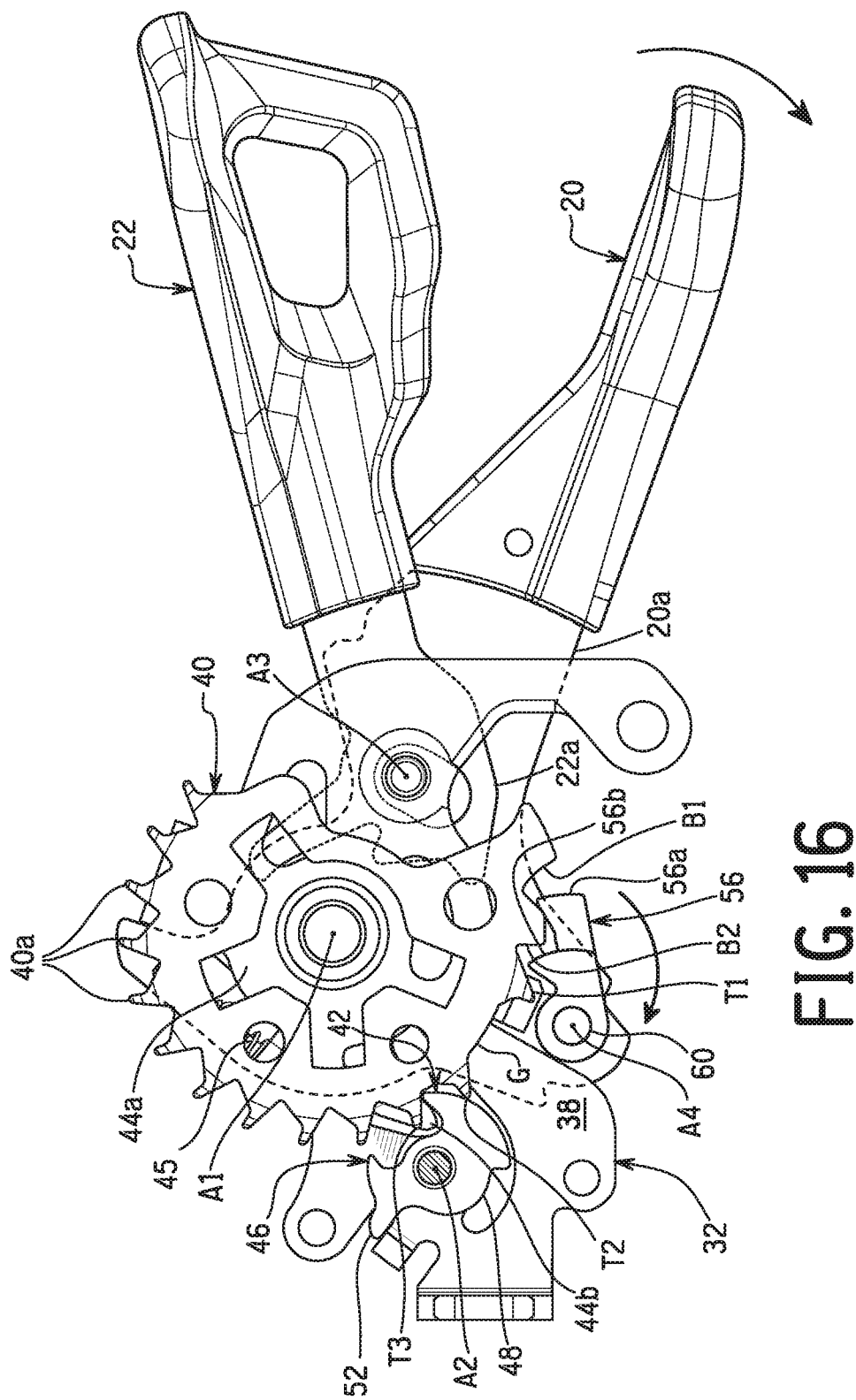
FIG. 16 is a top plan view of the selected parts of the bicycle operating device illustrated in FIGS. 13 to 15 but in which the first user operated input has been returned from the first operated position back to the first rest position such that the positioning ratchet is in a second ratchet position of the ratchet positions.

As seen in FIGS. 13 to 16, a cable pulling operation is illustrated. As seen in FIG. 13, the second contact part 56b is configured to contact the positioning ratchet 40 while the positioning ratchet 40 is in a fully released position in the second direction D2. In particular, with the positioning ratchet 40 in the fully released position, the second contact part 56b of the pulling pawl 56 contacts the first abutment B1 of the positioning ratchet 40 and is ready to pivot the positioning ratchet 40 in the first direction D1 about the first axis A1. Then as seen in FIGS. 14 and 15, operation of the first user operated input 20 from the first rest position towards the first operated position causes the pulling pawl 56 to pivot the positioning ratchet 40 in the first direction D1 about the first axis A1. Then, as seen in FIG. 16, the first user operated input 20 is released and returns to the first rest position under the biasing force of the biasing element 23. Then, from the position of the positioning ratchet 40 shown in FIG. 16, the second contact part 56b of the pulling pawl 56 is arranged to contact the second abutment B2 of the positioning ratchet 40 to pivot the positioning ratchet 40 in the first direction D1 about the first axis A1 during the next cable pulling operation.

Referring to FIGS. 16 to 19, the first contact part 56a is configured to not contact the positioning ratchet 40 while the positioning pawl 42 is in the holding position. Likewise, the second contact part 56b is configured to not contact the positioning ratchet 40 while the positioning pawl 42 is in the holding position. Thus, the positioning pawl 42 can be engaged certainly with one of the ratchet teeth 40a to selectively establish the plurality of predetermined positions of the positioning ratchet 40 with respect to the base 12 while the positioning pawl 42 is in the holding position. Moreover, the first contact part 56a is configured to be positioned between two of the plurality of the ratchet teeth 40a of the positioning ratchet 40 while the positioning pawl 42 is in the holding position. Thus, the first contact part 56a can be quickly engaged with one of the ratchet teeth 40a during a cable pulling operation for those positions in which the first contact part 56a is used to pivot the positioning ratchet 40 in the first direction D1. Likewise, the second contact part 56b is configured to be positioned between two of the plurality of the ratchet teeth 40a of the positioning ratchet 40 while the positioning pawl 42 is in the holding position. Thus, the second contact part 56b can be quickly engaged with one of the ratchet teeth 40a during a cable pulling operation for those positions in which the second contact part 56b is used to pivot the positioning ratchet 40 in the first direction D1.

Figure 17:
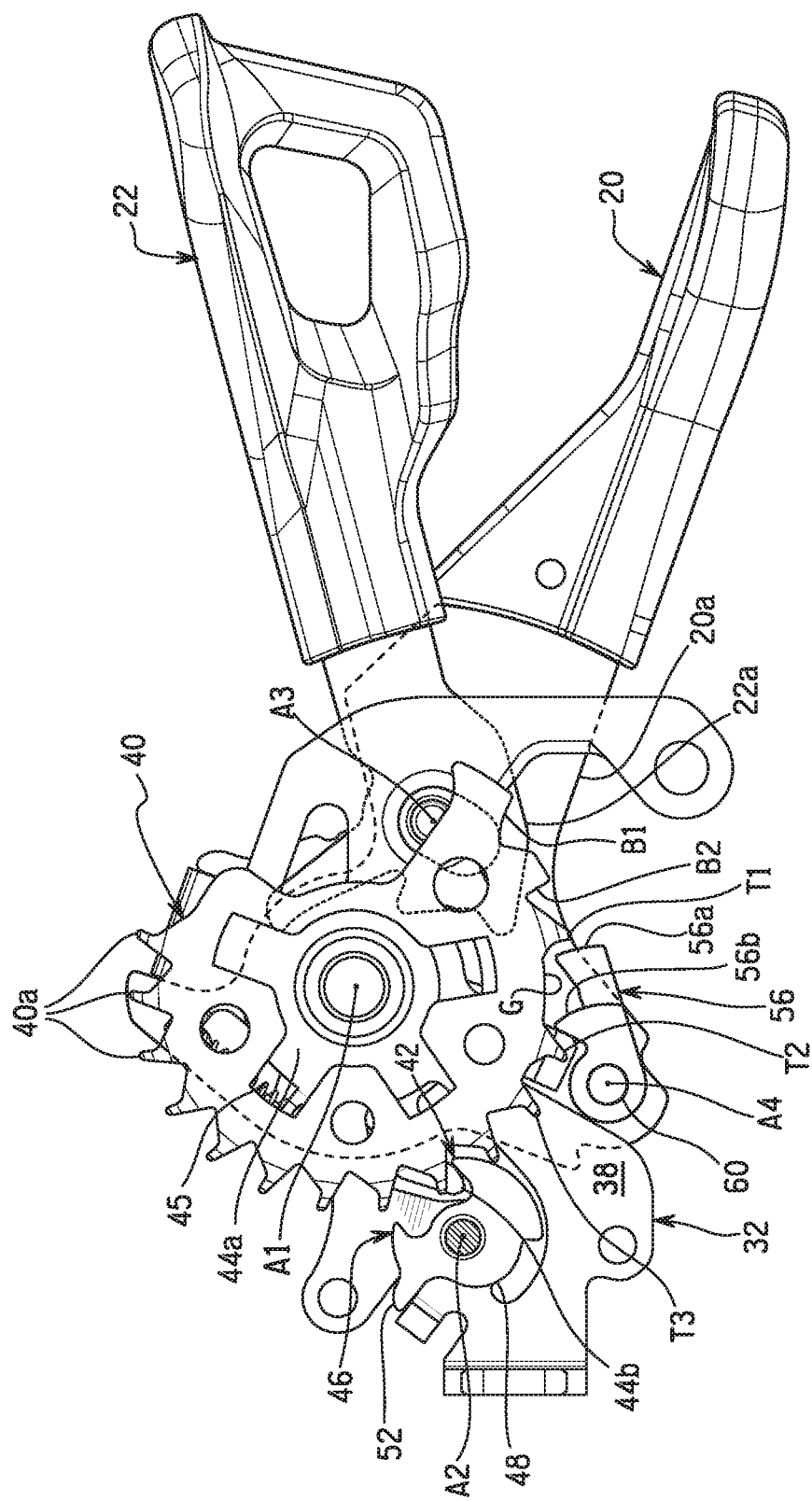
FIG. 17 is a top plan view of the selected parts of the bicycle operating device illustrated in FIGS. 13 to 16 but in which the first and second user operated inputs are in the first and second rest positions, respectively, and the positioning ratchet is in a fourth ratchet position of the ratchet positions.

Referring now to FIG. 17, the positioning ratchet 40 is shown in a first predetermined position of the predetermined positions of the positioning ratchet 40 that are established by the positioning pawl 42 engaging one of the ratchet teeth 40a. The first predetermined position corresponds to a fourth ratchet position of the positioning ratchet 40 where the fully released position of FIG. 13 corresponds to a first ratchet position of the positioning ratchet 40.

As seen in FIG. 17, the first contact part 56a of the pulling pawl 56 is configured to contact the positioning ratchet 40 to move the positioning ratchet 40 during movement of the positioning ratchet 40 in the first direction D1 from the first predetermined position (FIG. 17) of the predetermined positions. In particular, the first contact part 56a is configured to contact the first ratchet tooth T1 of the plurality of the ratchet teeth 40a of the positioning ratchet 40 during movement of the positioning ratchet 40 in the first direction D1 from the first predetermined position. In other words, in the first predetermined position (FIG. 17) of the positioning ratchet 40, the first contact part 56a of the pulling pawl 56 is contacting the first ratchet tooth T1 the positioning ratchet 40 such that operation of the first user operated input 20 from the first rest position towards the first operated position causes the positioning ratchet 40 to pivot in the first direction D1 about the first axis A1. On the other hand, as can be determined from FIG. 17, the second contact part 56b is configured to not contact the positioning ratchet 40 during movement of the positioning ratchet 40 in the first direction D1 from the first predetermined position. Rather, the second contact part 56b is located in the gap G between the first ratchet tooth T1 and the second ratchet tooth T2.

Figure 18:
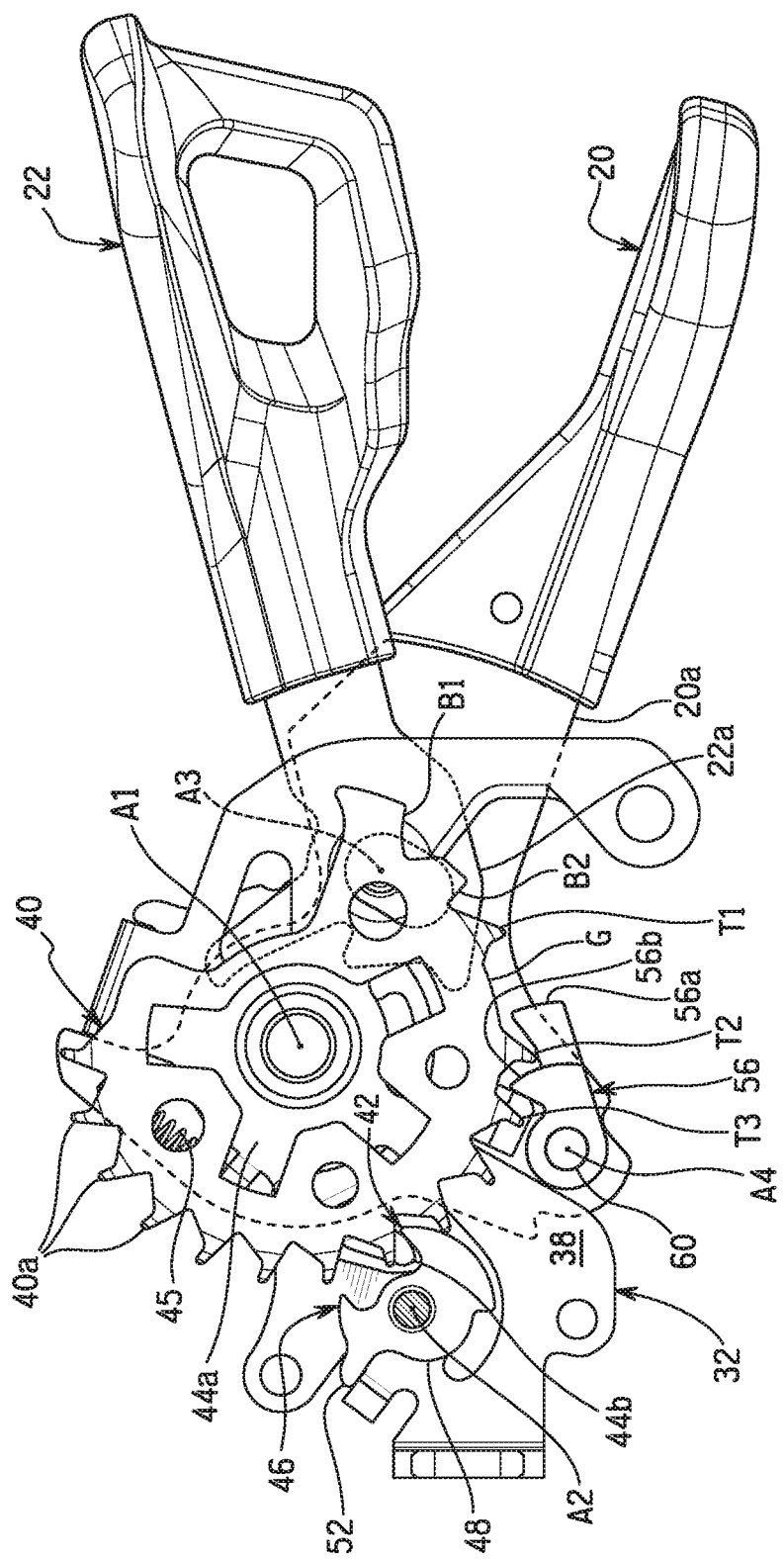
FIG. 18 is a top plan view of the selected parts of the bicycle operating device illustrated in FIGS. 13 to 17 but in which the first and second user operated inputs are in the first and second rest positions, respectively, and the positioning ratchet is in a fifth ratchet position of the ratchet positions.

Referring now to FIG. 18, the positioning ratchet 40 is shown in a second predetermined position of the predetermined positions of the positioning ratchet 40 that are established by the positioning pawl 42 engaging one of the ratchet teeth 40a. The second predetermined position corresponds to a fifth ratchet position of the positioning ratchet 40. As seen in FIG. 18, the second contact part 56b of the pulling pawl 56 is configured to contact the positioning ratchet 40 to move the positioning ratchet 40 during movement of the positioning ratchet 40 in the first direction D1 from the second predetermined position (FIG. 18) of the predetermined positions. Specifically, the second contact part 56b is configured to contact the second ratchet tooth T2 of the ratchet teeth 40a during movement of the positioning ratchet 40 in the first direction D1 from the second predetermined position. Clearly, as seen in FIG. 18, the first predetermined position is different from the second predetermined position. Here, the second predetermined position of the positioning ratchet 40 is the next predetermined position of the positioning ratchet 40 from the first predetermined position (FIG. 17) of the positioning ratchet 40 during a cable pulling operation. On the other hand, as can be determined from FIG. 18, the first contact part 56a is configured to not contact the positioning ratchet 40 during movement of the positioning ratchet 40 in the first direction D1 from the second predetermined position. Rather, the first contact part 56a is located in the gap G between the first ratchet tooth T1 and the second ratchet tooth T2.

Figure 19:
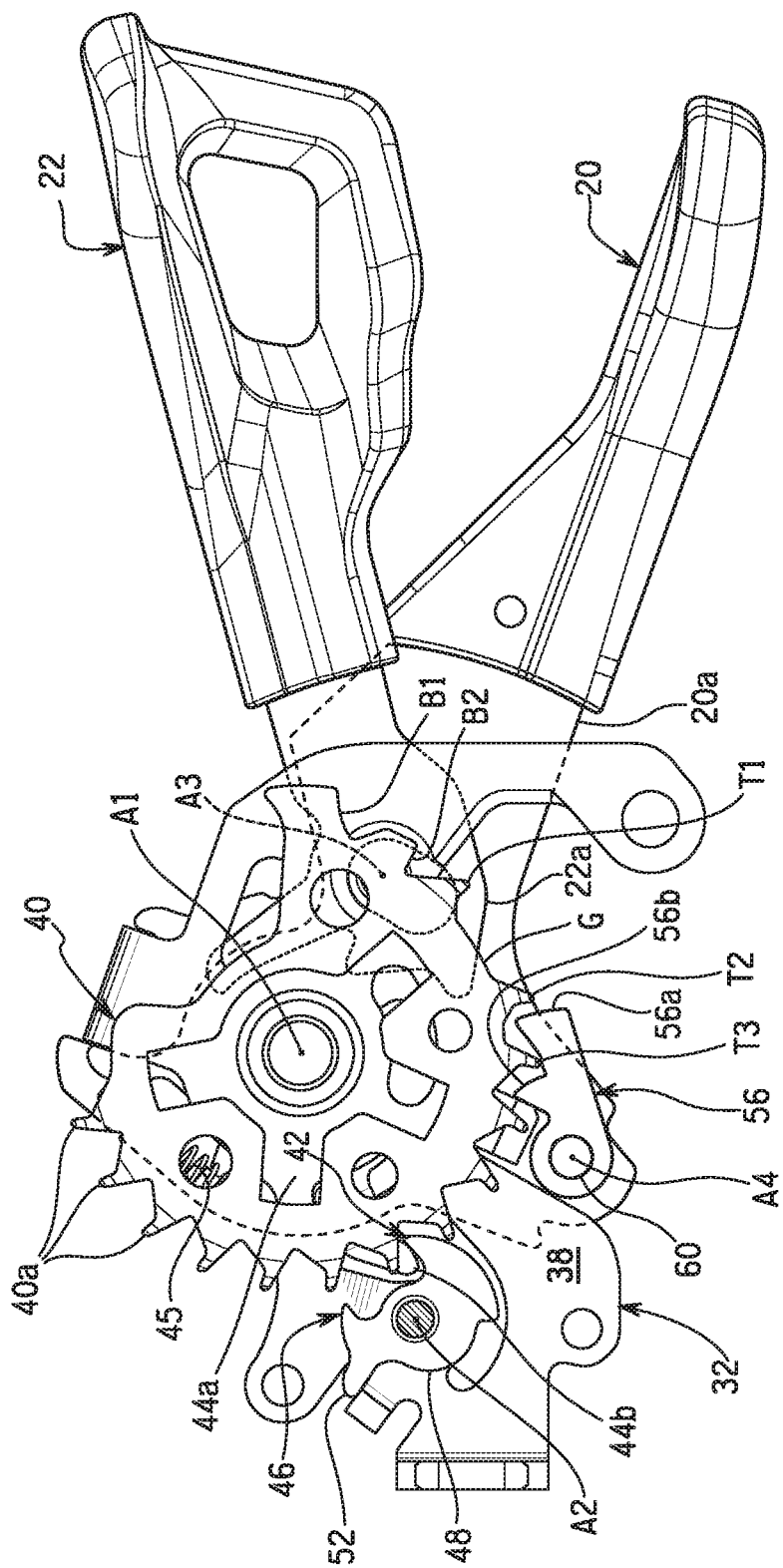
FIG. 19 is a top plan view of the selected parts of the bicycle operating device illustrated in FIGS. 13 to 18 but in which the first and second user operated inputs are in the first and second rest positions, respectively, and the positioning ratchet is in a sixth ratchet position of the ratchet positions.

Referring now to FIG. 19, the positioning ratchet 40 is shown in a third predetermined position of the predetermined positions of the positioning ratchet 40 that are established by the positioning pawl 42 engaging one of the ratchet teeth 40a. The third predetermined position corresponds to a sixth ratchet position of the positioning ratchet 40. As seen in FIG. 19, the first contact part 56a and the second contact part 56b are configured to both contact the positioning ratchet 40 during movement of the positioning ratchet 40 in the first direction D1 from a third predetermined position (FIG. 19) of the predetermined positions. Namely, with the positioning ratchet 40 in the third predetermined position of FIG. 19, the second contact part 56b and the first contact part 56a are arranged to engage the second and third ratchet teeth T2 and T3. Thus, the first contact part 56a and the second contact part 56b are each configured to contact one of the ratchet teeth 40a of the positioning ratchet 40 during movement of the positioning ratchet 40 in the first direction D1 from the third predetermined position (FIG. 19) of the predetermined positions. Clearly, as seen in FIG. 19, the third predetermined position is different from the first predetermined position and the second predetermined position.

Referring now to FIGS. 20 to 24, a cable releasing operation will now be discussed. As mentioned above, a cable releasing operation is performed by moving the second user operated input 22 from the second rest position towards the second operated position. The second user operated input 22 can be moved from the second rest position in either the second operating direction R2 or the third operating direction R3 to perform the cable releasing operation. In particular, when the second user operated input 22 is operated from the second rest position by pivoting the second user operated input 22 in the second operating direction R2, the second user operated input 22 will pivot on the support pin 35 about the third axis A3. On the other hand, the when the second user operated input 22 is operated from the second rest position by pivoting the second user operated input 22 in the third operating direction R3, the second user operated input 22 will pivot on the shaft 28 about the first axis A1. This dual release direction of the second user operated input 22 is accomplished by providing the attachment portion 22a with an elongated curved slot 22c that receives the support shaft 35, and two projections 22a1 and 22a2 that mate with the projection 44d of the release 44. Thus, the projections 22a1 and 22a2 mate with the projection 44d such that the second user operated input 22 and the release 44 do not move relative to each other while the second user operated input 22 is in the second rest position. However, the projections 22a1 and 22a2 are configured with respect to the projection 44d such that the second user operated input 22 pivots on the support shaft 35 with respect to the release 44, which pivots on the shaft 28, as the second user operated input 22 is moved in the second operating direction R2. On the other hand, the projections 22a1 and 22a2 are configured with respect to the projection 44d such that the second user operated input 22 and the release 44 pivot together as a unit (i.e., practically no relative movement) on the shaft 28 as the second user operated input 22 is moved in the third operating direction R3.

Figure 23:
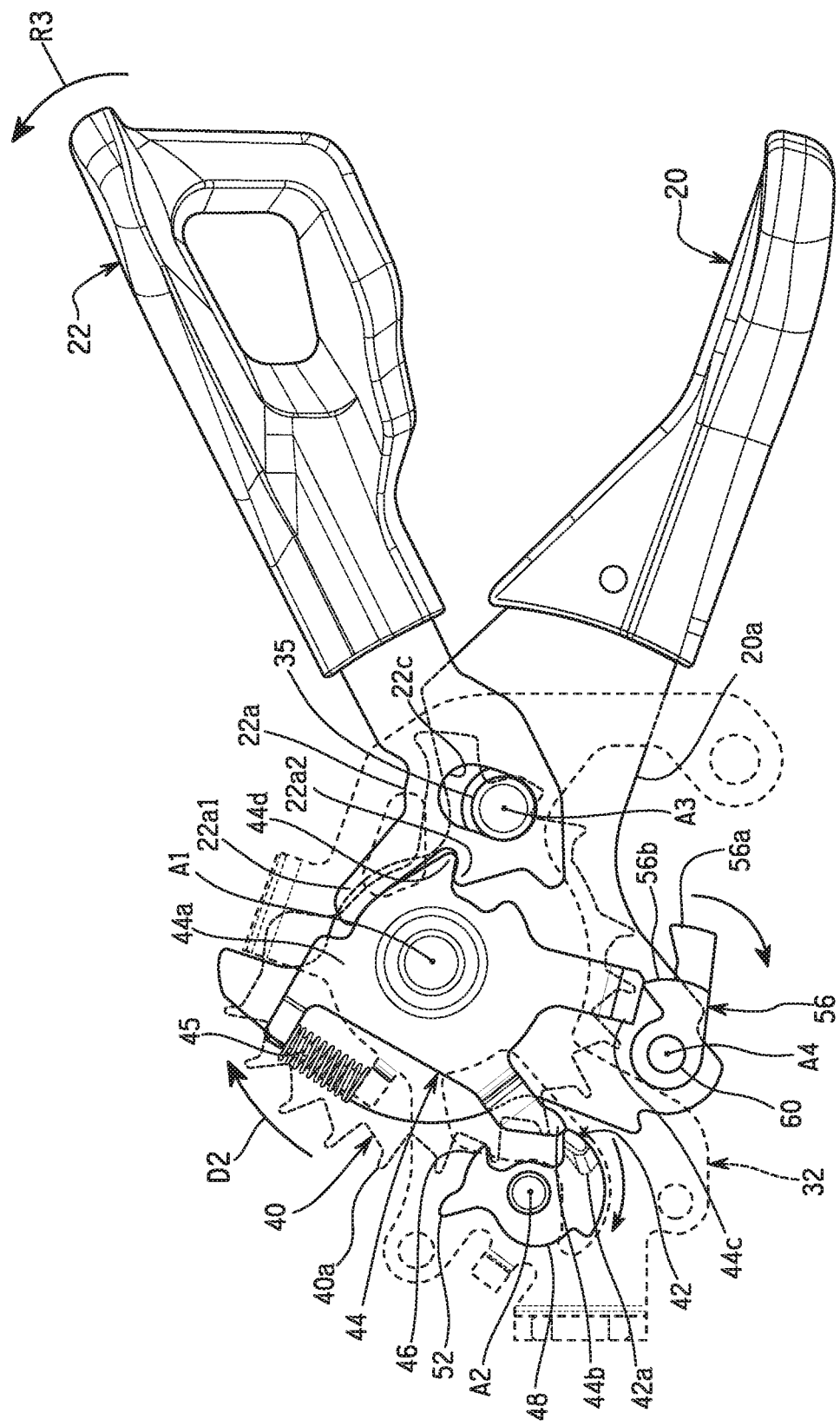
FIG. 23 is a top plan view of the selected parts of the bicycle operating device illustrated in FIGS. 20 and 22 but in which the second user operated input has been moved further from the second rest position towards the second of the second operated positions to perform a cable releasing operation from the sixth ratchet position to the fifth ratchet position.
Figure 24:
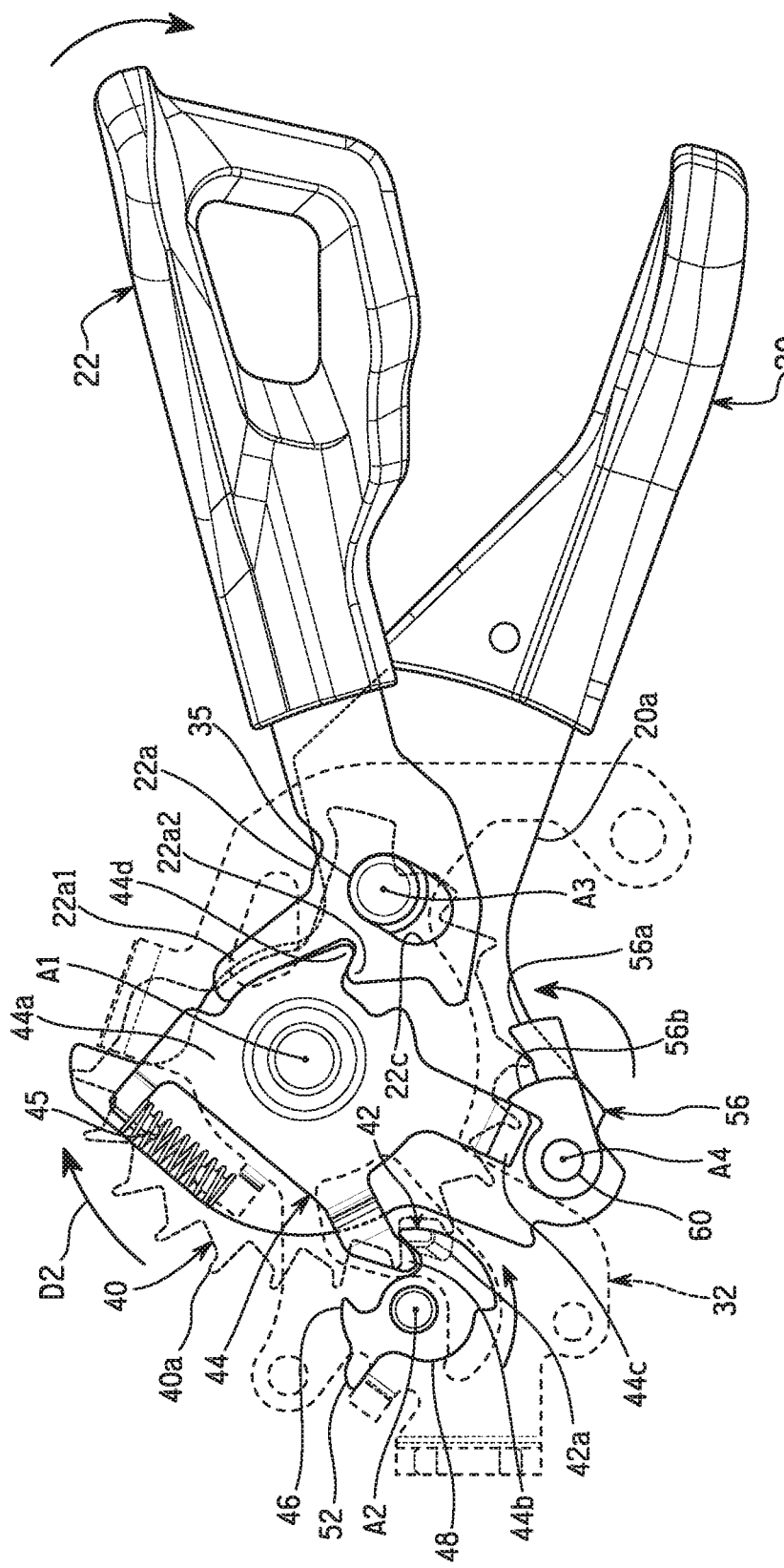
FIG. 24 is a top plan view of the selected parts of the bicycle operating device illustrated in FIGS. 20 to 23 but in which the second user operated input has been returned from the second operated position of FIG. 22 back to the second rest position such that the positioning ratchet is in the fifth ratchet position.

In either case, when the second user operated input 22 is moved from the second rest position towards either of the second operated positions, the release 44 is pivoted about the first axis A1 from the first position (FIGS. 20 and 24) to the second position (FIGS. 21 to 23). When the release 44 is moved from the first position (FIGS. 20 and 24) to the second position (FIGS. 21 to 23), the extension 44b of the release 44 engaging the positioning pawl 42 and the stop pawl 46 are pivoted about the second axis A2 by the projection 42a of the positioning pawl 42. In this way, in response to operation of the release 44, the positioning pawl 42 is pivoted from the holding position to the releasing position, and the stop pawl 46 is pivoted from the non-stopping position toward the stopping position in response to operation of the release 44. Also, as the release 44 moves from the first position to the second position, the abutment 44c of the release 44 engages the pulling pawl 56 to pivot the pulling pawl 56 out of the path of the ratchet teeth 40a. In this way, the positioning ratchet 40 can move in the second direction D2.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
    a base;
    a pulling pawl including a first contact part and a second contact part that is spaced apart from the first contact part;
    a positioning ratchet movably disposed with respect to the base in a first direction and a second direction that is opposite to the first direction; and
    a positioning pawl movably disposed with respect to the base between a holding position and a releasing position, the positioning pawl engaging the positioning ratchet to selectively establish a plurality of predetermined positions of the positioning ratchet with respect to the base while the positioning pawl is in the holding position, the positioning pawl being disengaged from the positioning ratchet to permit the positioning ratchet to move with respect to the base in the second direction while the positioning pawl is in the releasing position;
    the first contact part of the pulling pawl being configured to contact the positioning ratchet to move the positioning ratchet during movement of the positioning ratchet in the first direction from a first predetermined position of the predetermined positions, and the second contact part of the pulling pawl being configured to contact the positioning ratchet to move the positioning ratchet during movement of the positioning ratchet in the first direction from a second predetermined position of the predetermined positions, the first predetermined position being different from the second predetermined position; and
    at least one of: (i) the second contact part is configured to not contact the positioning ratchet during movement of the positioning ratchet in the first direction from the first predetermined position; or (ii) the first contact part is configured to not contact the positioning ratchet during movement of the positioning ratchet in the first direction from the second predetermined position.

2. The bicycle operating device according to claim 1, wherein
    the second contact part is configured to not contact the positioning ratchet during movement of the positioning ratchet in the first direction from the first predetermined position.

3. The bicycle operating device according to claim 1, wherein
    the first contact part is configured to not contact the positioning ratchet during movement of the positioning ratchet in the first direction from the second predetermined position.

4. The bicycle operating device according to claim 1, wherein
    the first contact part and the second contact part are configured to both contact the positioning ratchet during movement of the positioning ratchet in the first direction from a third predetermined position of the predetermined positions, the third predetermined position is different from the first predetermined position and the second predetermined position.

5. The bicycle operating device according to claim 1, wherein
    the first contact part is configured to contact a first ratchet tooth of a plurality of ratchet teeth of the positioning ratchet during movement of the positioning ratchet in the first direction from the first predetermined position,
    the second contact part is configured to contact a second ratchet tooth of the ratchet teeth during movement of the positioning ratchet in the first direction from the second predetermined position, the first ratchet tooth is different from the second ratchet tooth, and the first contact part and the second contact part are each configured to contact one of the ratchet teeth of the positioning ratchet during movement of the positioning ratchet in the first direction from a third predetermined position of the predetermined positions, the third predetermined position is different from the first predetermined position and the second predetermined position.

6. The bicycle operating device according to claim 5, wherein
the second ratchet tooth is next to the first ratchet tooth.

7. The bicycle operating device according to claim 1, wherein
the second contact part is configured to contact the positioning ratchet while the positioning ratchet is in a fully released position in the second direction.

8. The bicycle operating device according to claim 1, wherein
the positioning ratchet has at least twelve of the predetermined positions that are established by the positioning pawl selectively engaging to the positioning ratchet.

9. The bicycle operating device according to claim 1, further comprising
a stop pawl movably disposed with respect to the base between a non-stopping position and a stopping position, the stop pawl being disposed out of a movement path of the positioning ratchet in the non-stopping position, and the stop pawl being disposed in the movement path of the positioning ratchet in the stopping position.

10. The bicycle operating device according to claim 9, wherein
the stop pawl is biased towards the non-stopping position.

11. The bicycle operating device according to claim 9, wherein
the stop pawl and the positioning pawl are connected by a mounting portion that is pivotally mounted with respect to the base.

12. The bicycle operating device according to claim 1, further comprising
a wire takeup arranged to move together with the positioning ratchet as the positioning ratchet moves with respect to the base.

13. The bicycle operating device according to claim 1, further comprising
a first user operated input movably arranged with respect to the base between a first rest position and a first operated position, the first user operated input being operatively coupled to the pulling pawl to move the positioning ratchet with respect to the base in the first direction as the first user operated input moves from the first rest position towards the first operated position.

14. The bicycle operating device according to claim 13, wherein
the positioning ratchet and the first user operated input are pivotally mounted with respect to the base about a common pivot axis.

15. The bicycle operating device according to claim 1, further comprising
a release movably disposed with respect to the base between a first position and a second position, the release moving the positioning pawl from the holding position to the releasing position as the release moves from the first position towards the second position.

16. The bicycle operating device according to claim 15, further comprising a second user operated input movably arranged with respect to the base between a second rest position and a second operated position, the second user operated input being operatively coupled to the release, the second user operated input moving the release from the first position towards the second position as the second user operated input moves from the second rest position towards the second operated position.

17. The bicycle operating device according to claim 1, further comprising
a handlebar attachment coupled to the base.

18. A bicycle operating device comprising:
a base;
a pulling pawl including a first contact part and a second contact part that is spaced apart from the first contact part;
a positioning ratchet movably disposed with respect to the base in a first direction and a second direction that is opposite to the first direction; and
a positioning pawl movably disposed with respect to the base between a holding position and a releasing position, the positioning pawl engaging the positioning ratchet to selectively establish a plurality of predetermined positions of the positioning ratchet with respect to the base while the positioning pawl is in the holding position, the positioning pawl being disengaged from the positioning ratchet to permit the positioning ratchet to move with respect to the base in the second direction while the positioning pawl is in the releasing position;
the first contact part of the pulling pawl being configured to contact the positioning ratchet to move the positioning ratchet during movement of the positioning ratchet in the first direction from a first predetermined position of the predetermined positions, and the second contact part of the pulling pawl being configured to contact the positioning ratchet to move the positioning ratchet during movement of the positioning ratchet in the first direction from a second predetermined position of the predetermined positions, the first predetermined position being different from the second predetermined position; and
at least one of: (i) the first contact part is configured to be positioned between two of a plurality of ratchet teeth of the positioning ratchet while the positioning pawl is in the holding position; (ii) the first contact part is configured to not contact the positioning ratchet while the positioning pawl is in the holding position; (iii) the second contact part is configured to be positioned between two of the plurality of ratchet teeth of the positioning ratchet while the positioning pawl is in the holding position; or (iv) the second contact part is configured to not contact the positioning ratchet while the positioning pawl is in the holding position.

19. The bicycle operating device according to claim 18, wherein
the first contact part is configured to not contact the positioning ratchet while the positioning pawl is in the holding position.

20. The bicycle operating device according to claim 18, wherein
the second contact part is configured to be positioned between two of the plurality of ratchet teeth of the positioning ratchet while the positioning pawl is in the holding position.

21. The bicycle operating device according to claim 18, wherein the second contact part is configured to not contact the positioning ratchet while the positioning pawl is in the holding position.

22. The bicycle operating device according to claim 18, wherein
the first contact part is configured to be positioned between two of the plurality of ratchet teeth of the positioning ratchet while the positioning pawl is in the holding position.

23. A bicycle operating device comprising:
a base;
a pulling pawl including a first contact part and a second contact part that is spaced apart from the first contact part;
a positioning ratchet movably disposed with respect to the base in a first direction and a second direction that is opposite to the first direction; and
a positioning pawl movably disposed with respect to the base between a holding position and a releasing position, the positioning pawl engaging the positioning ratchet to selectively establish a plurality of predetermined positions of the positioning ratchet with respect to the base while the positioning pawl is in the holding position, the positioning pawl being disengaged from the positioning ratchet to permit the positioning ratchet to move with respect to the base in the second direction while the positioning pawl is in the releasing position;
the first contact part of the pulling pawl being configured to contact the positioning ratchet to move the positioning ratchet during movement of the positioning ratchet in the first direction from a first predetermined position of the predetermined positions, and the second contact part of the pulling pawl being configured to contact the positioning ratchet to move the positioning ratchet during movement of the positioning ratchet in the first direction from a second predetermined position of the predetermined positions, the first predetermined position being different from the second predetermined position; and
the positioning pawl is configured to not engage ratchet teeth of the positioning ratchet while the positioning ratchet is in a fully released position in the second direction.

24. A bicycle operating device comprising:
a base;
a pulling pawl including a first contact part and a second contact part that is spaced apart from the first contact part;
a positioning ratchet movably disposed with respect to the base in a first direction and a second direction that is opposite to the first direction; and
a positioning pawl movably disposed with respect to the base between a holding position and a releasing position, the positioning pawl engaging the positioning ratchet to selectively establish a plurality of predetermined positions of the positioning ratchet with respect to the base while the positioning pawl is in the holding position, the positioning pawl being disengaged from the positioning ratchet to permit the positioning ratchet to move with respect to the base in the second direction while the positioning pawl is in die releasing position;
the first contact part of the pulling pawl being configured to contact the positioning ratchet to move the positioning ratchet during movement of the positioning ratchet in the first direction from a first predetermined position of the predetermined positions, and the second contact part of the pulling pawl being configured to contact the positioning ratchet to move the positioning ratchet during movement of the positioning ratchet in the first direction from a second predetermined position of the predetermined positions, the first predetermined position being different from the second predetermined position; and
the positioning ratchet includes a plurality of ratchet teeth, with at least three of the ratchet teeth equally spaced apart by a first predetermined pitch interval and at least one of the ratchet teeth that is different from the three of the ratchet teeth spaced apart from an adjacent one of the ratchet teeth by a second predetermined pitch interval that is larger than the first predetermined pitch interval.

* * * * *